United States Patent Office

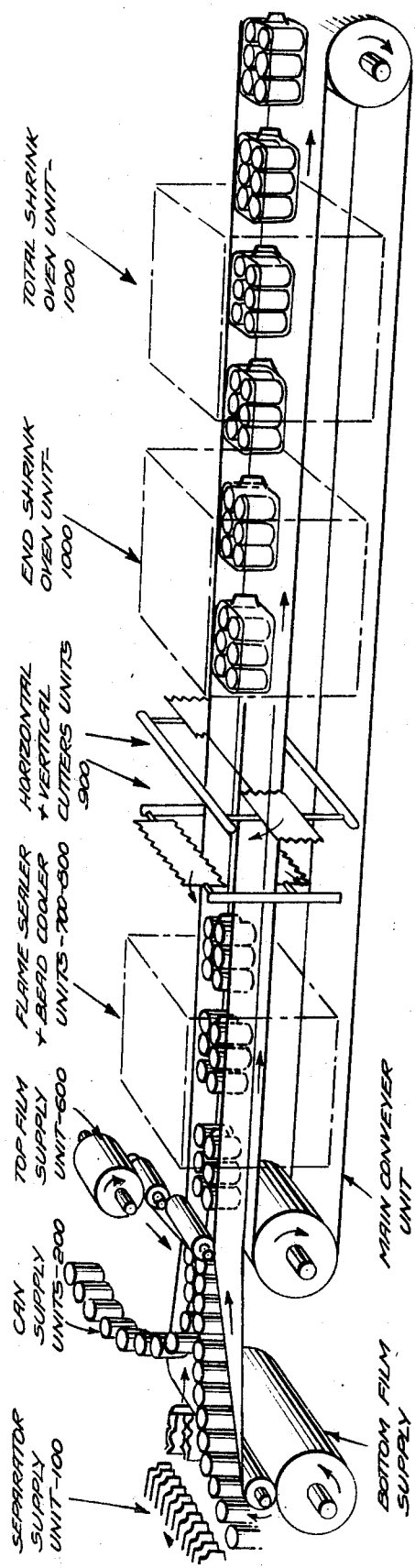
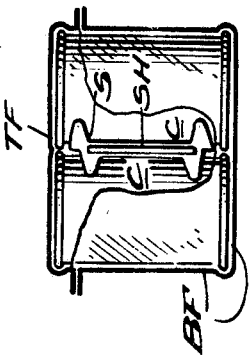
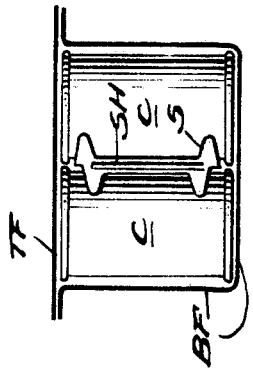
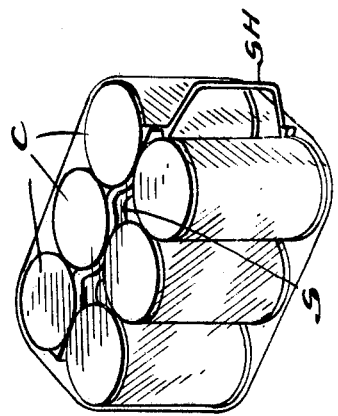

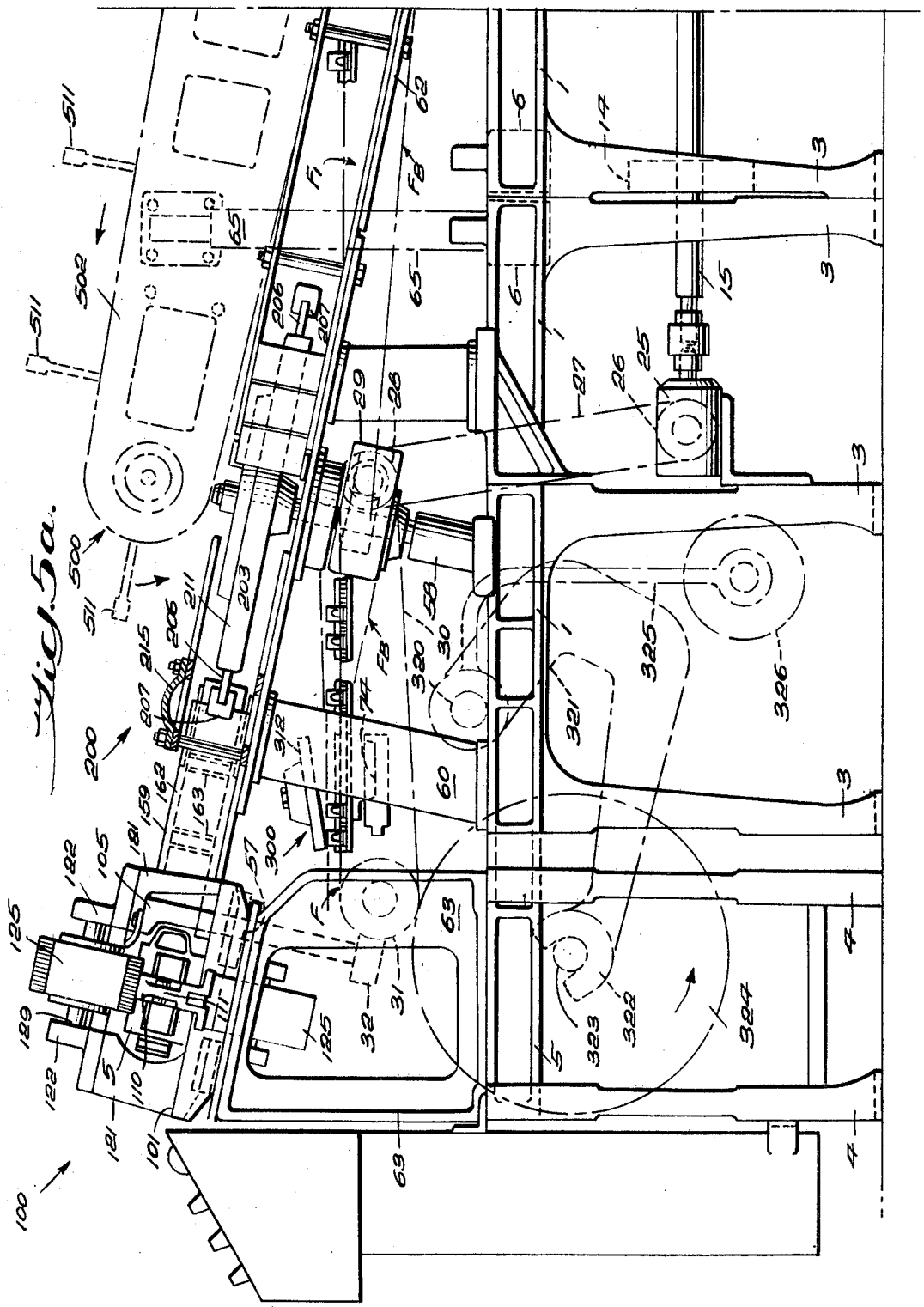

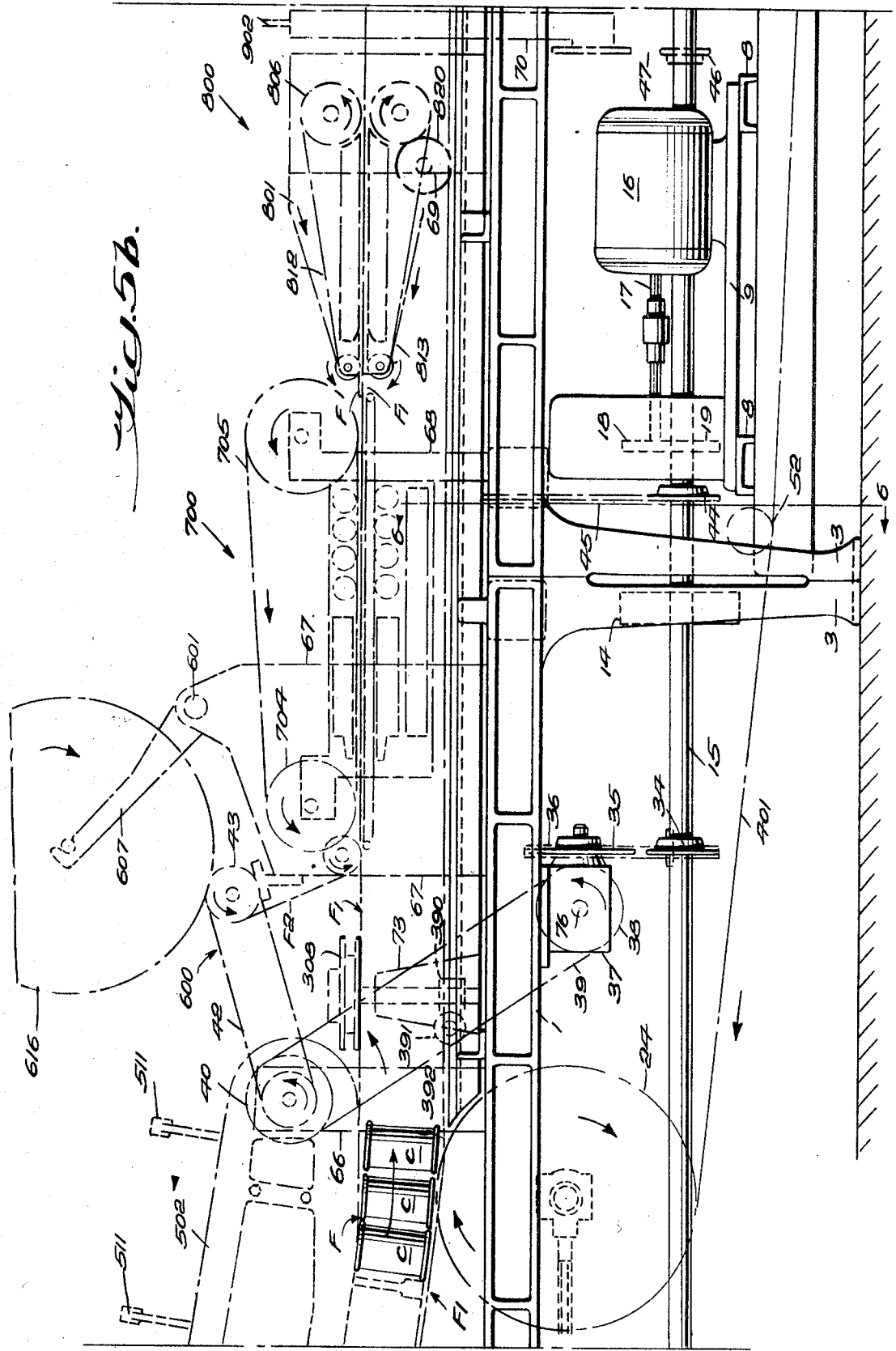

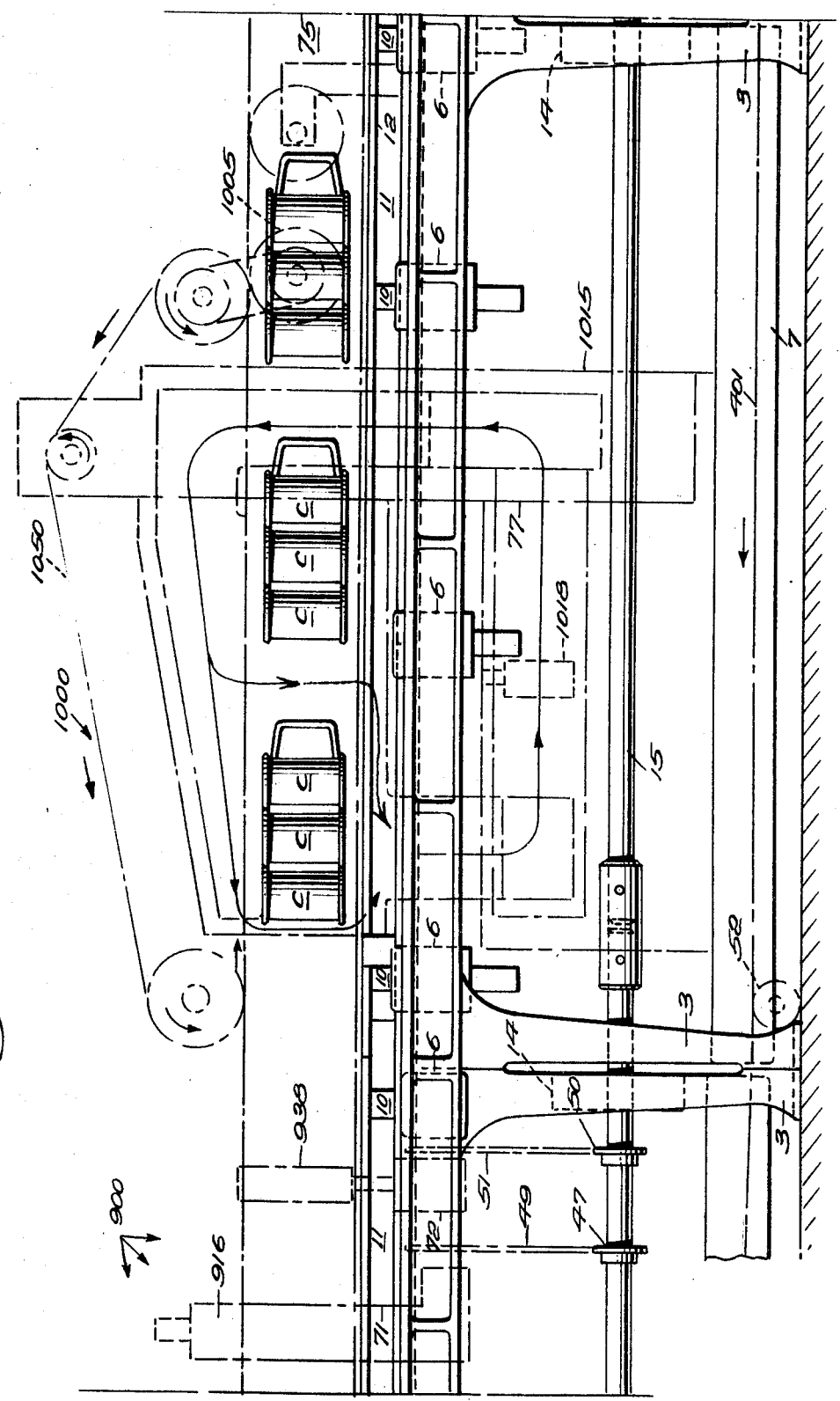

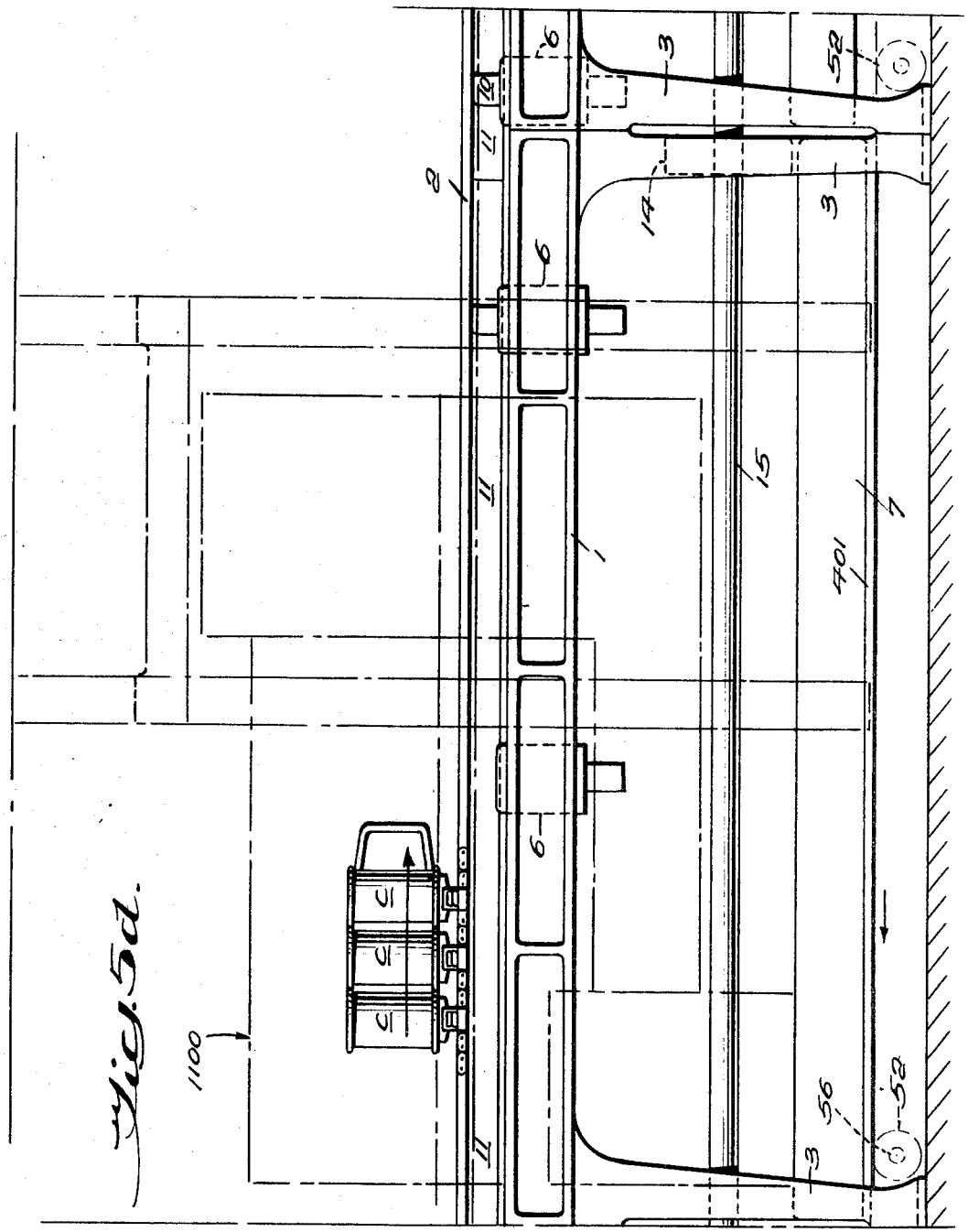

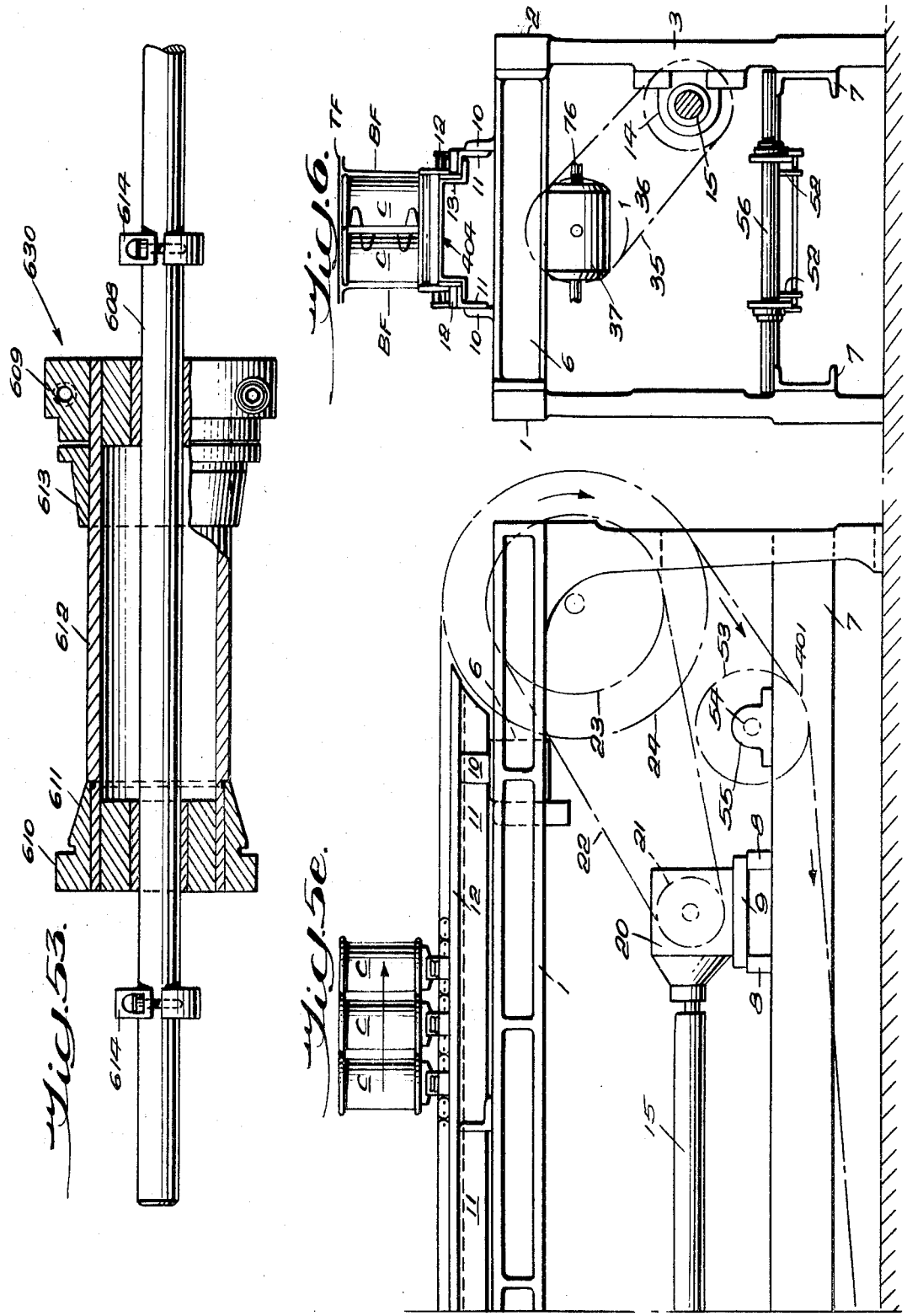

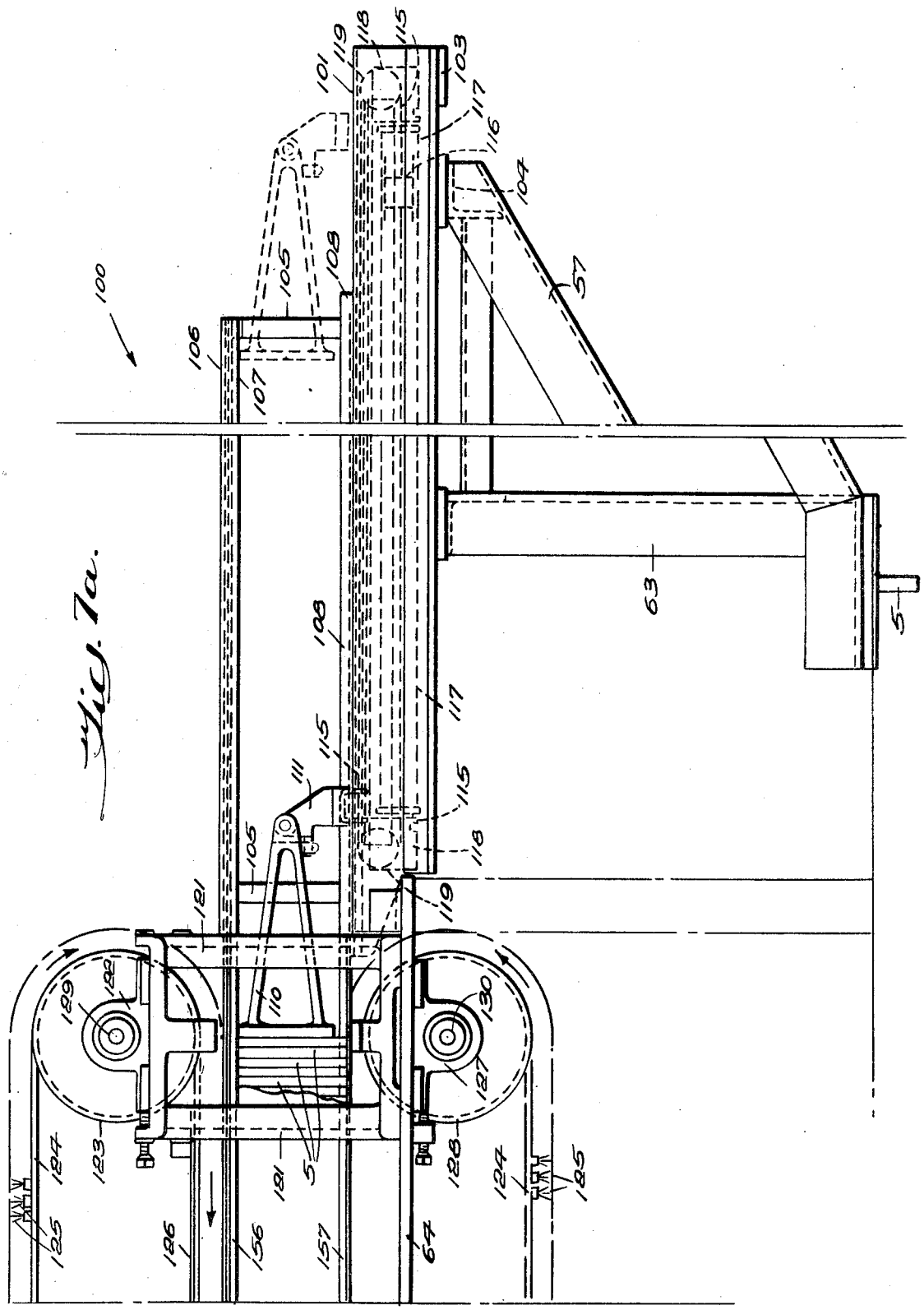

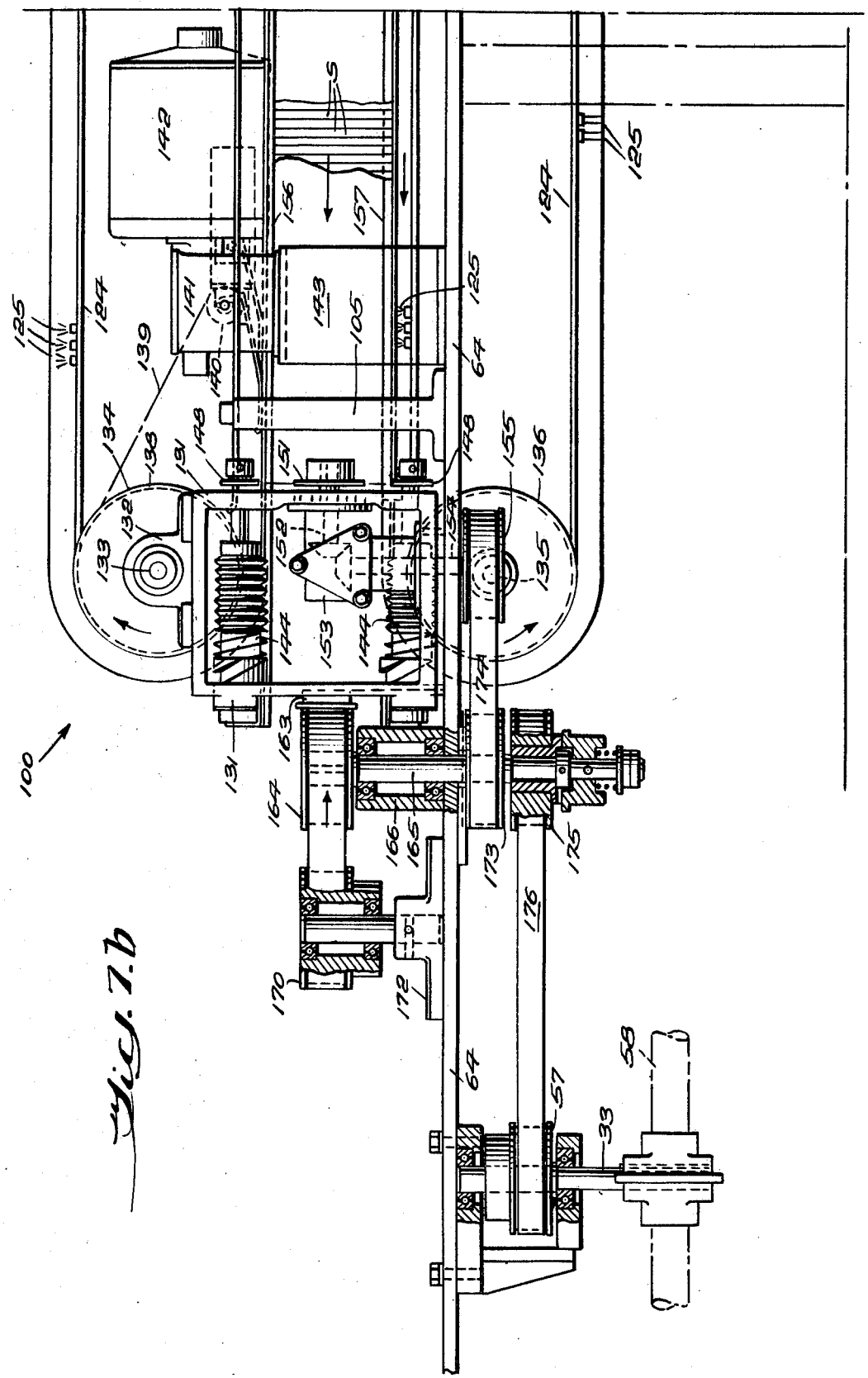

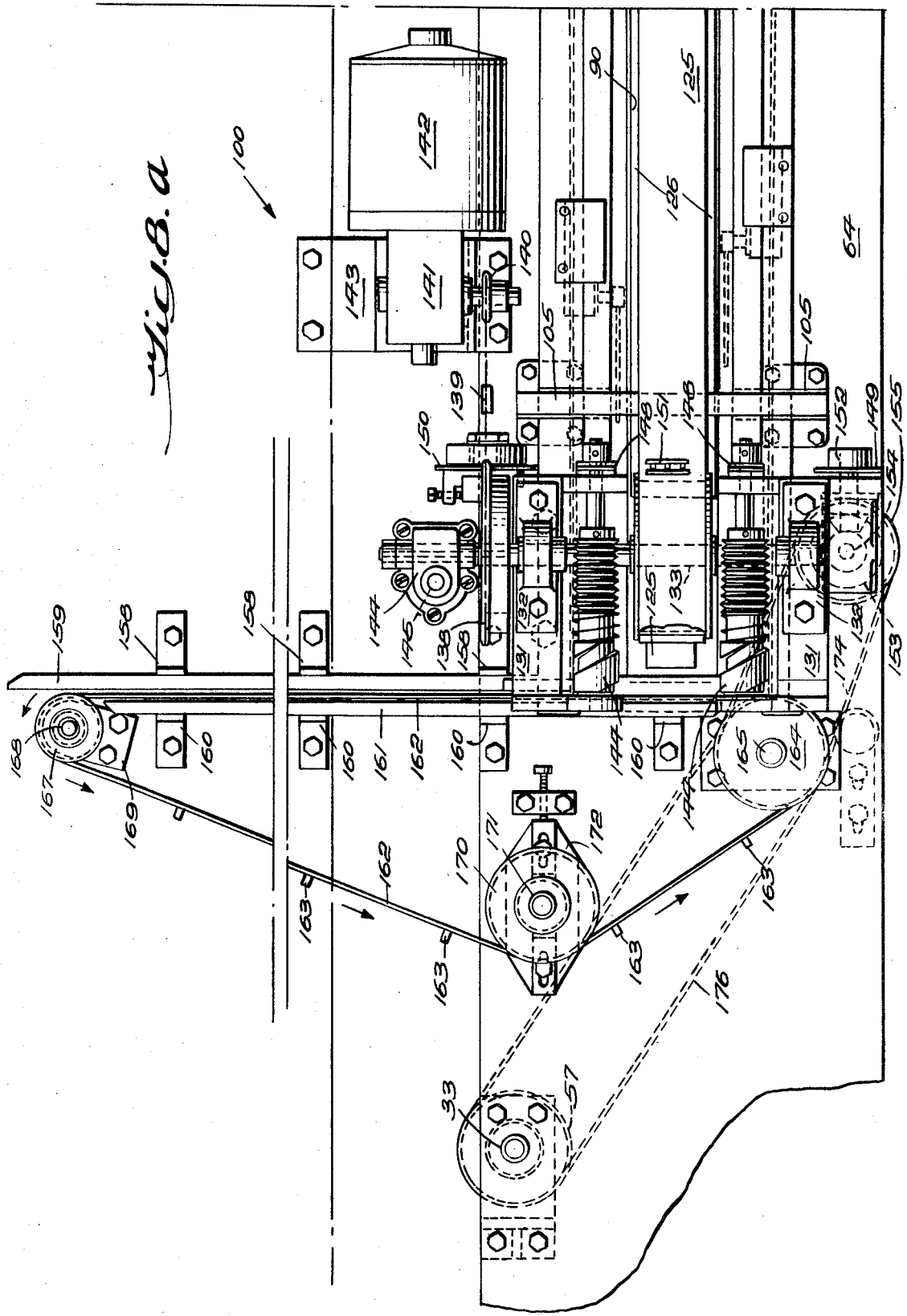

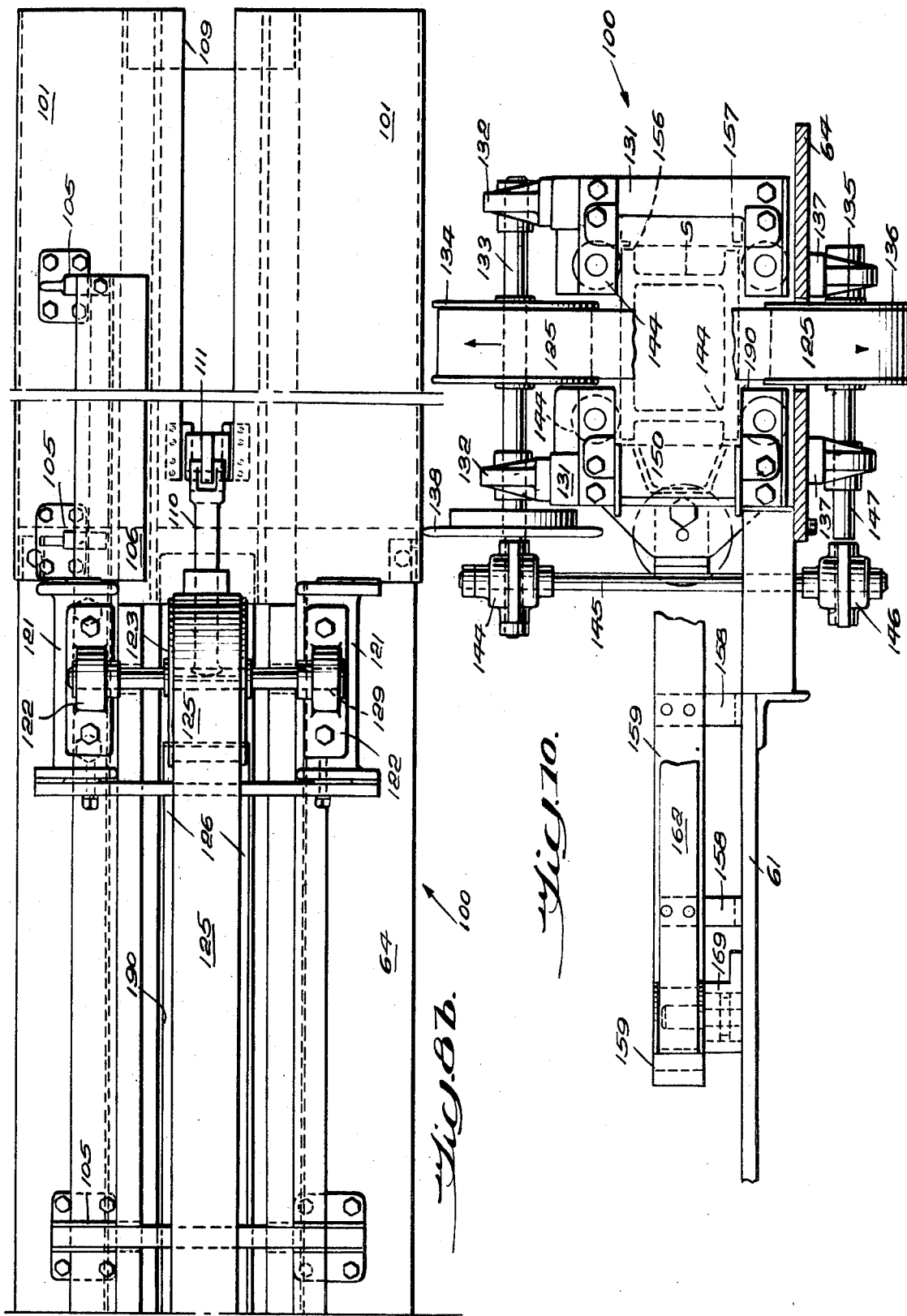

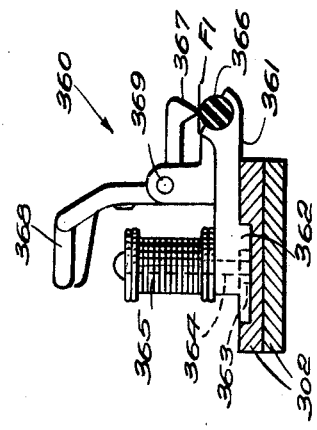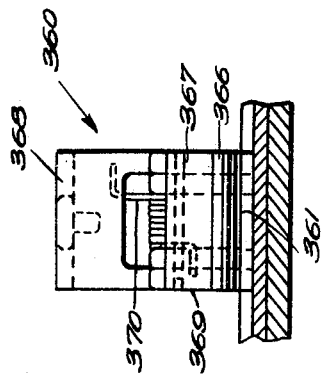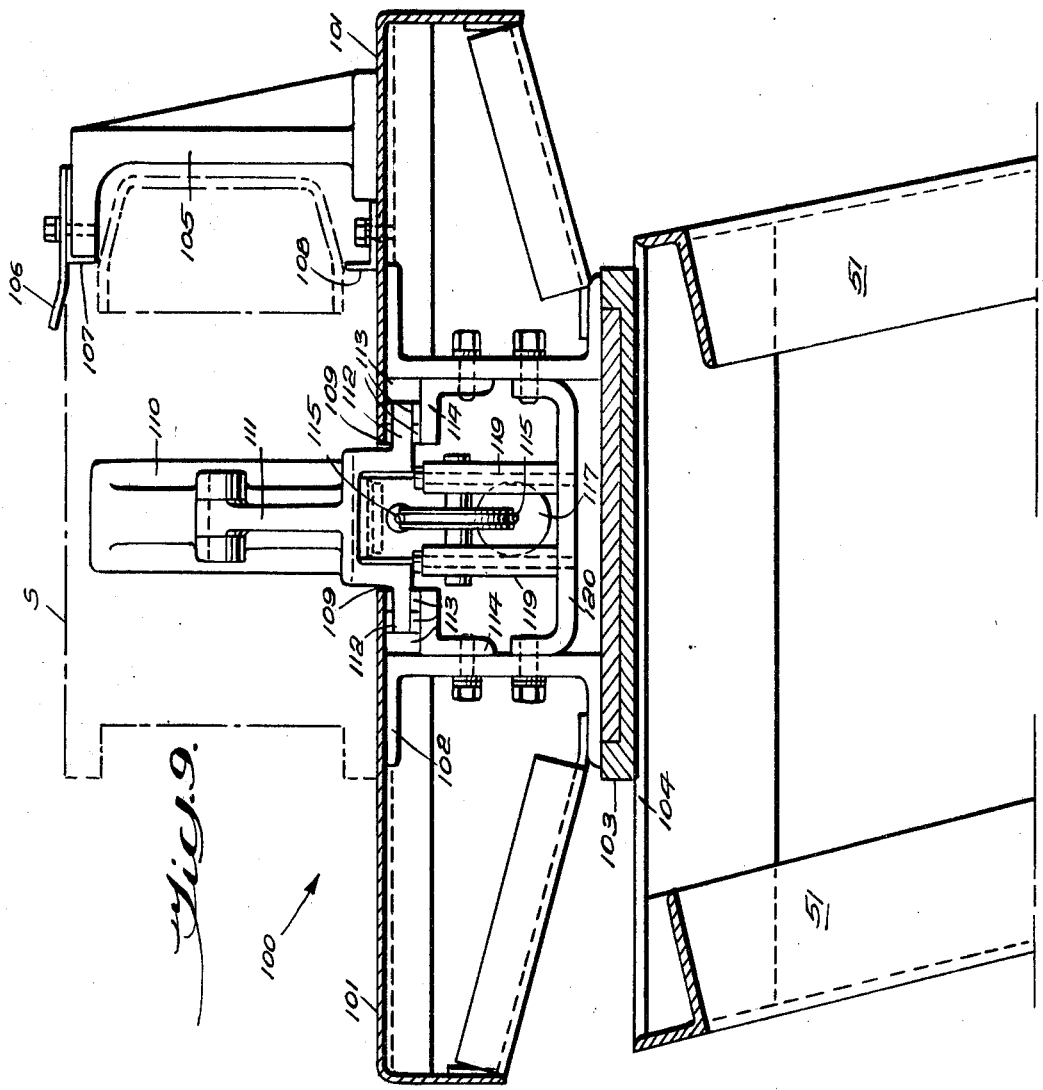

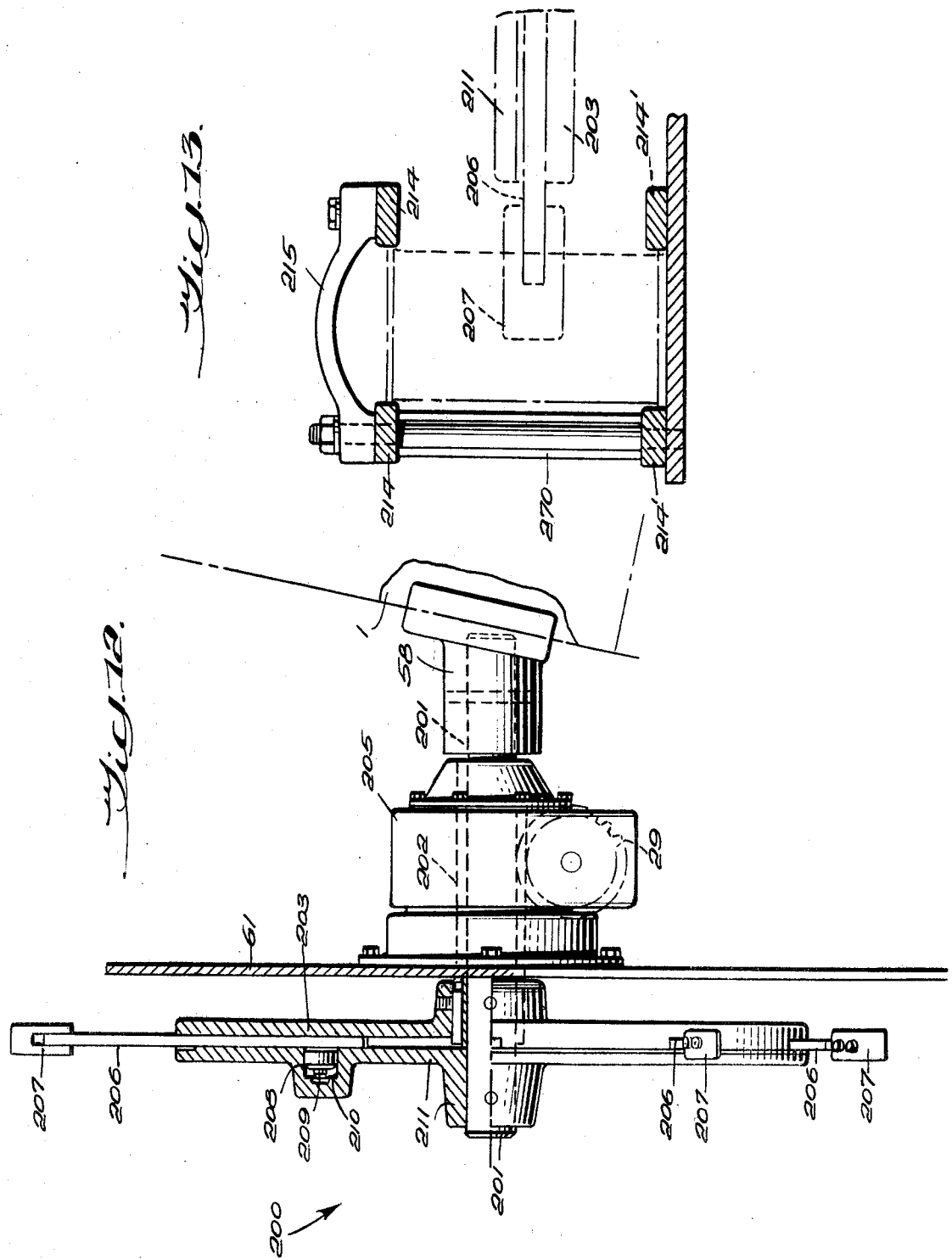

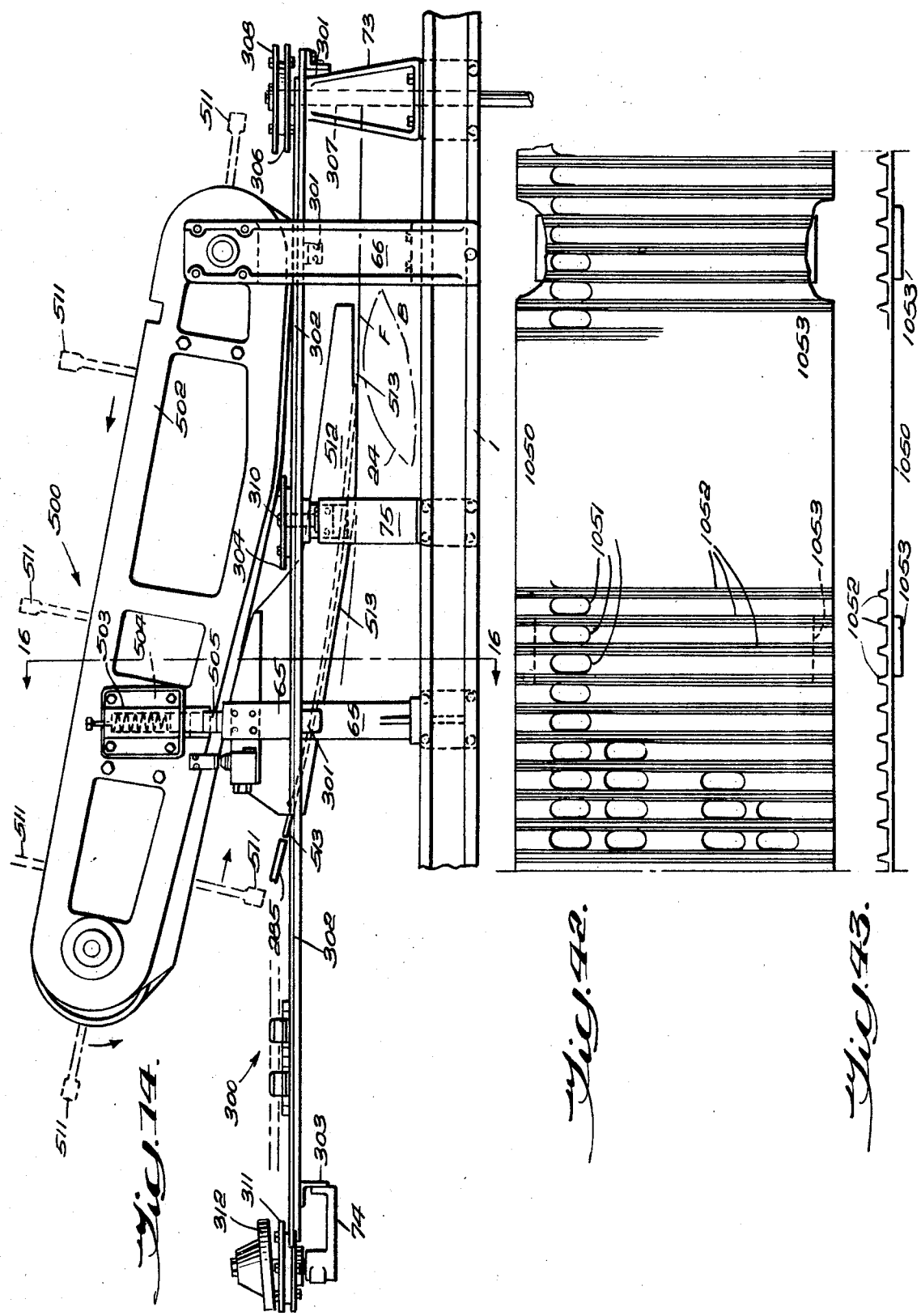

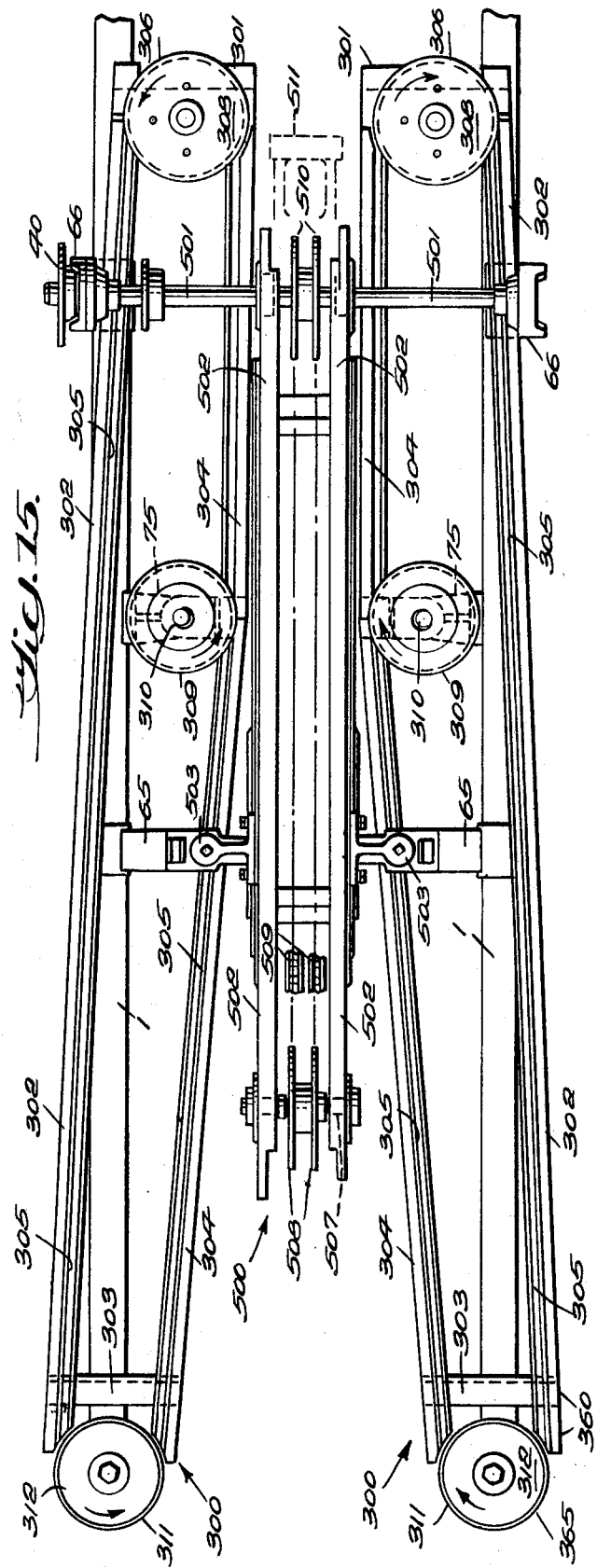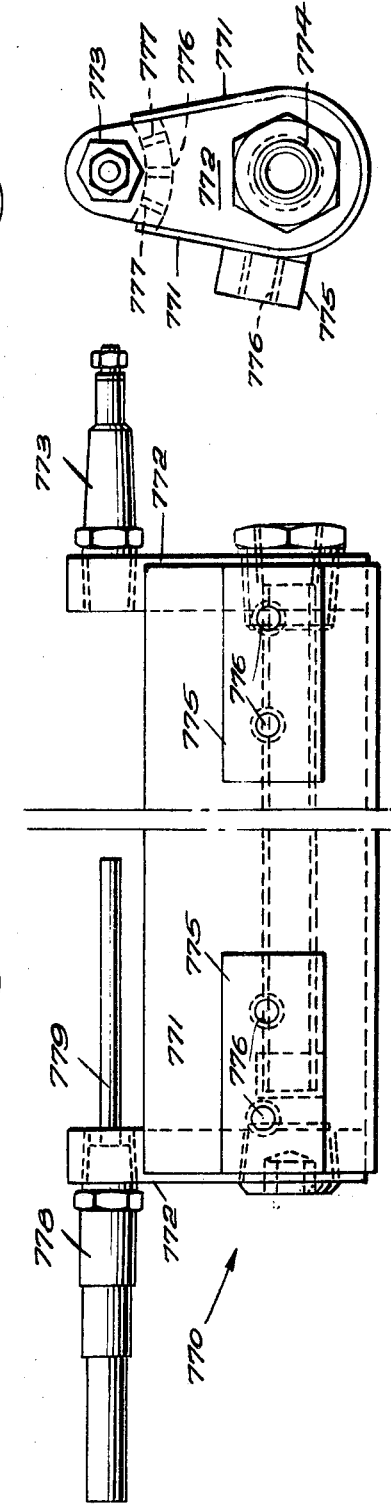

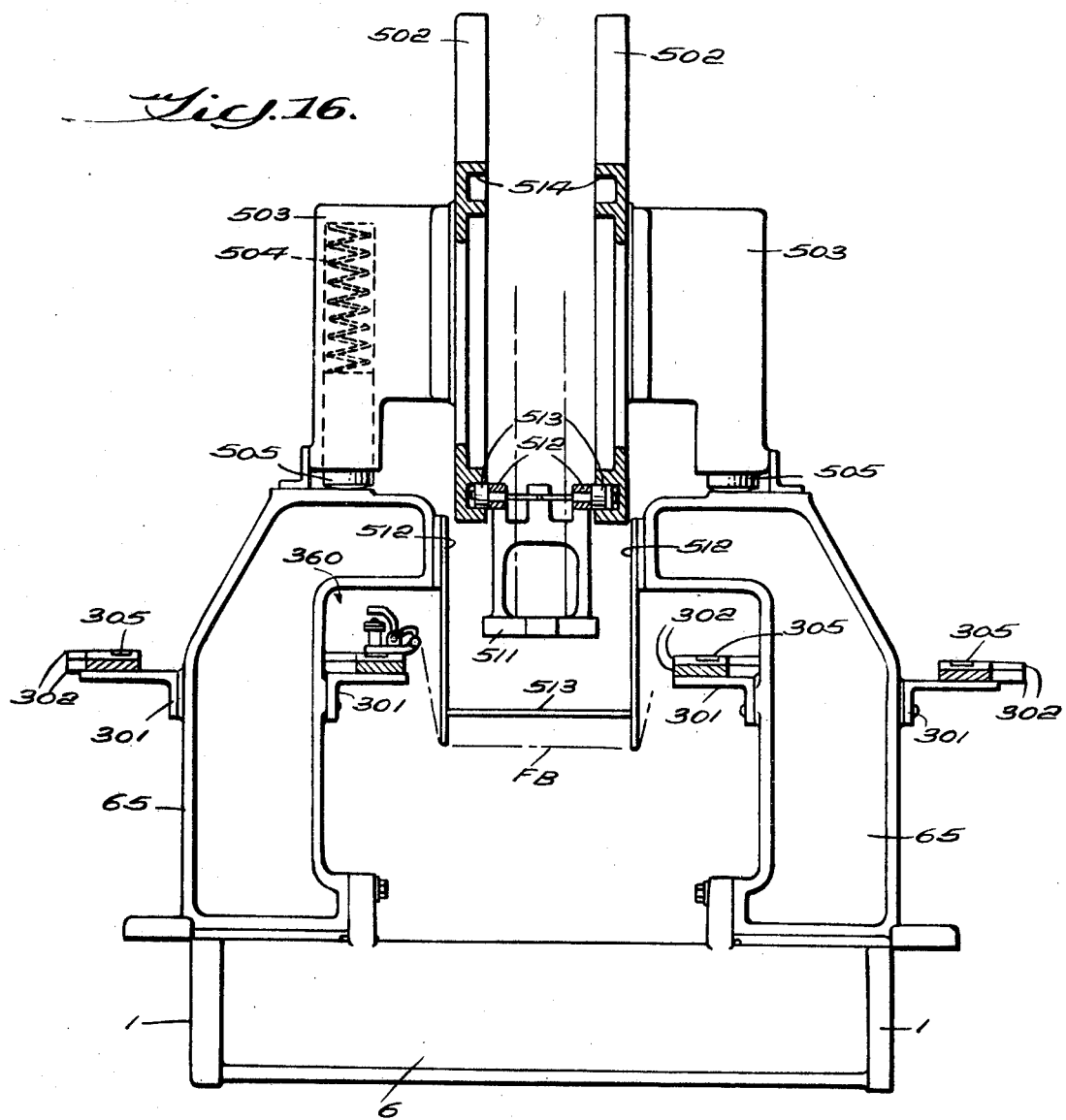

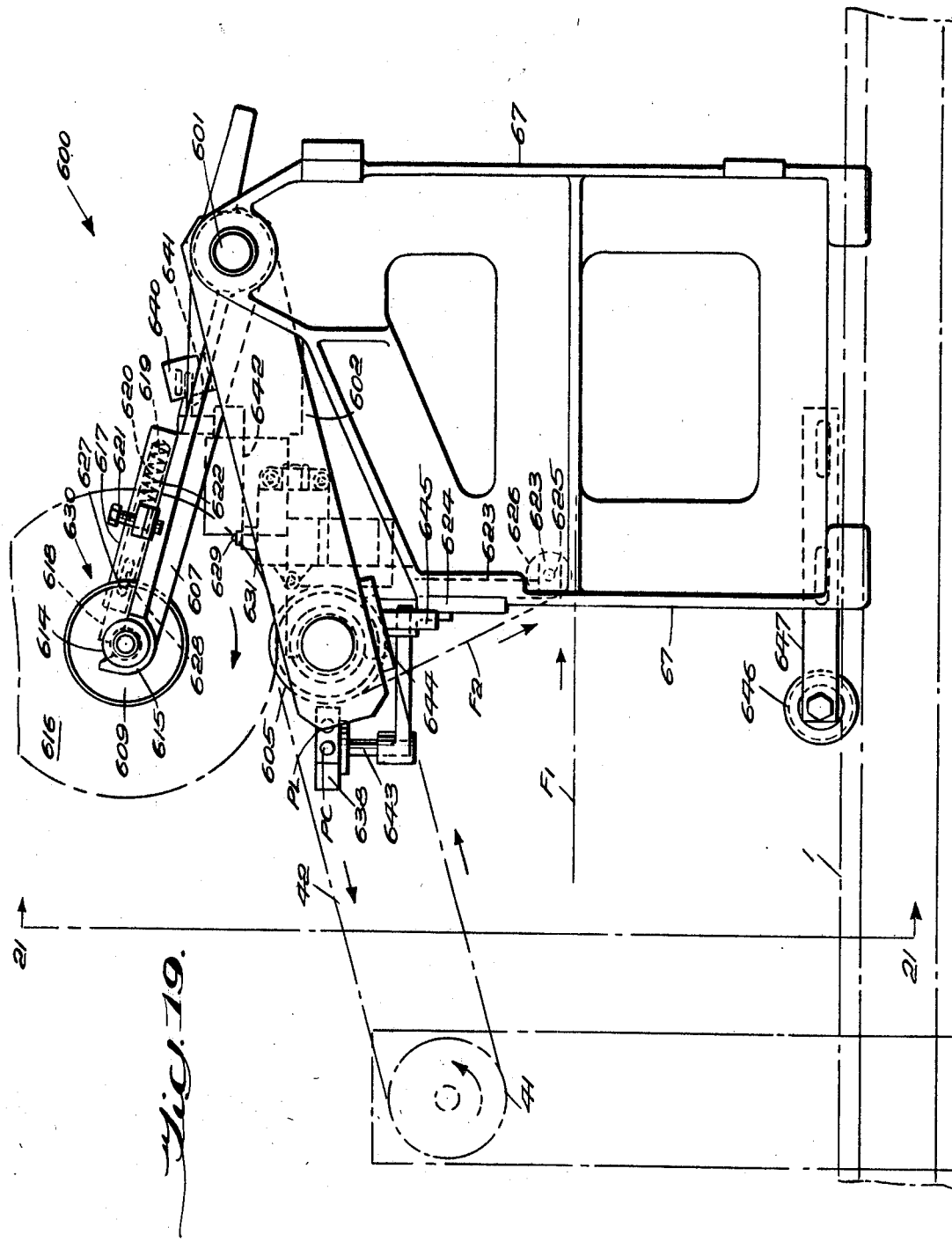

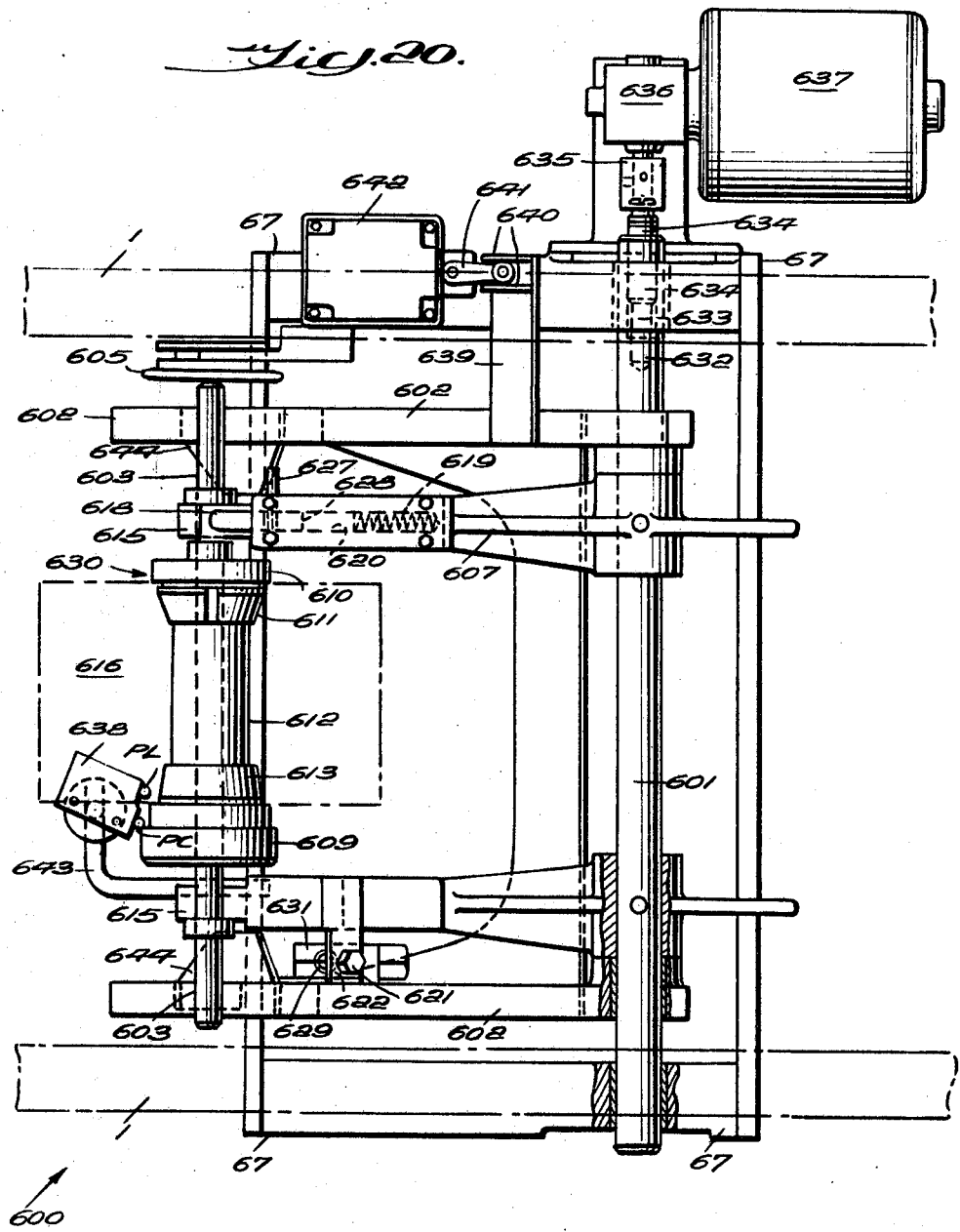

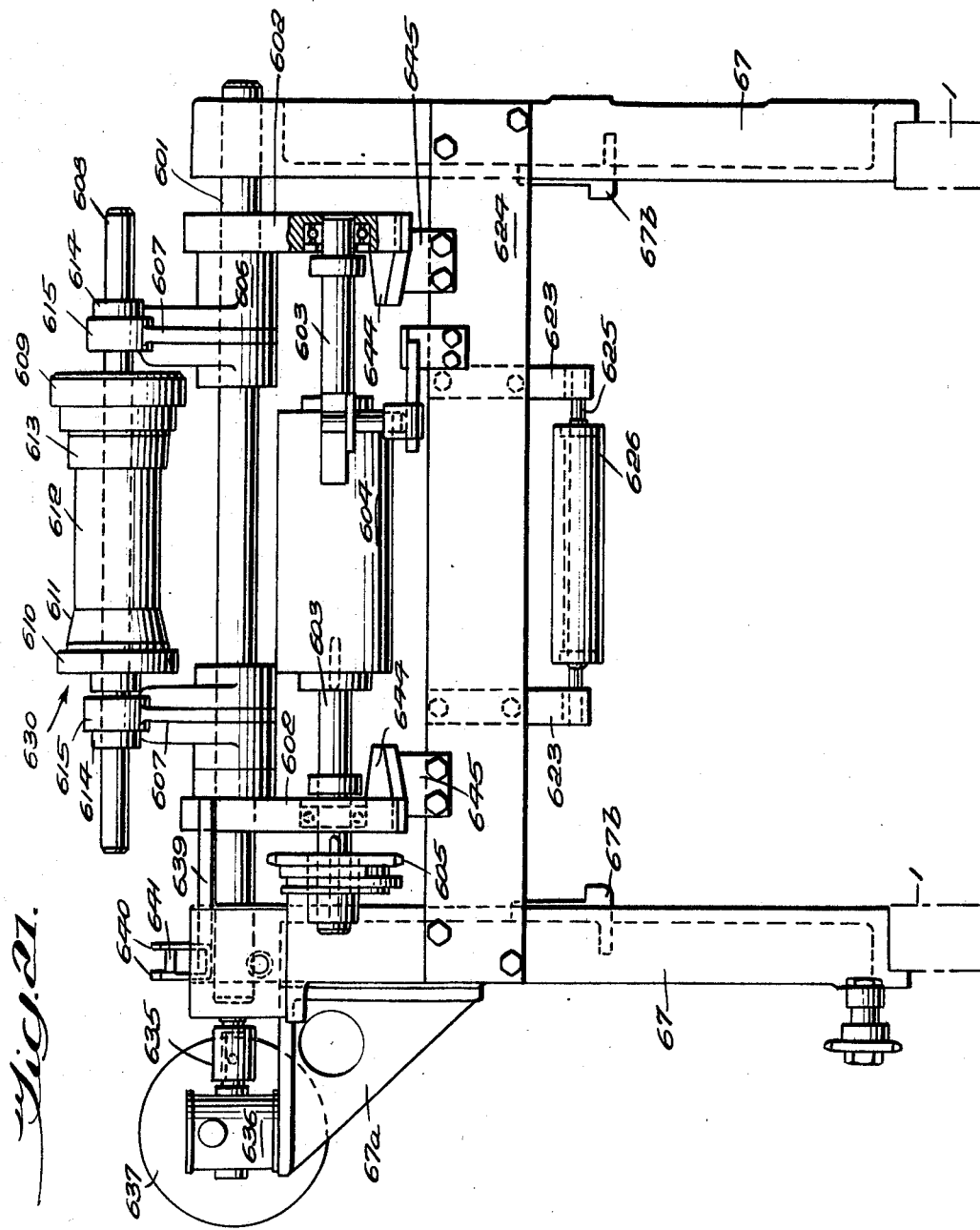

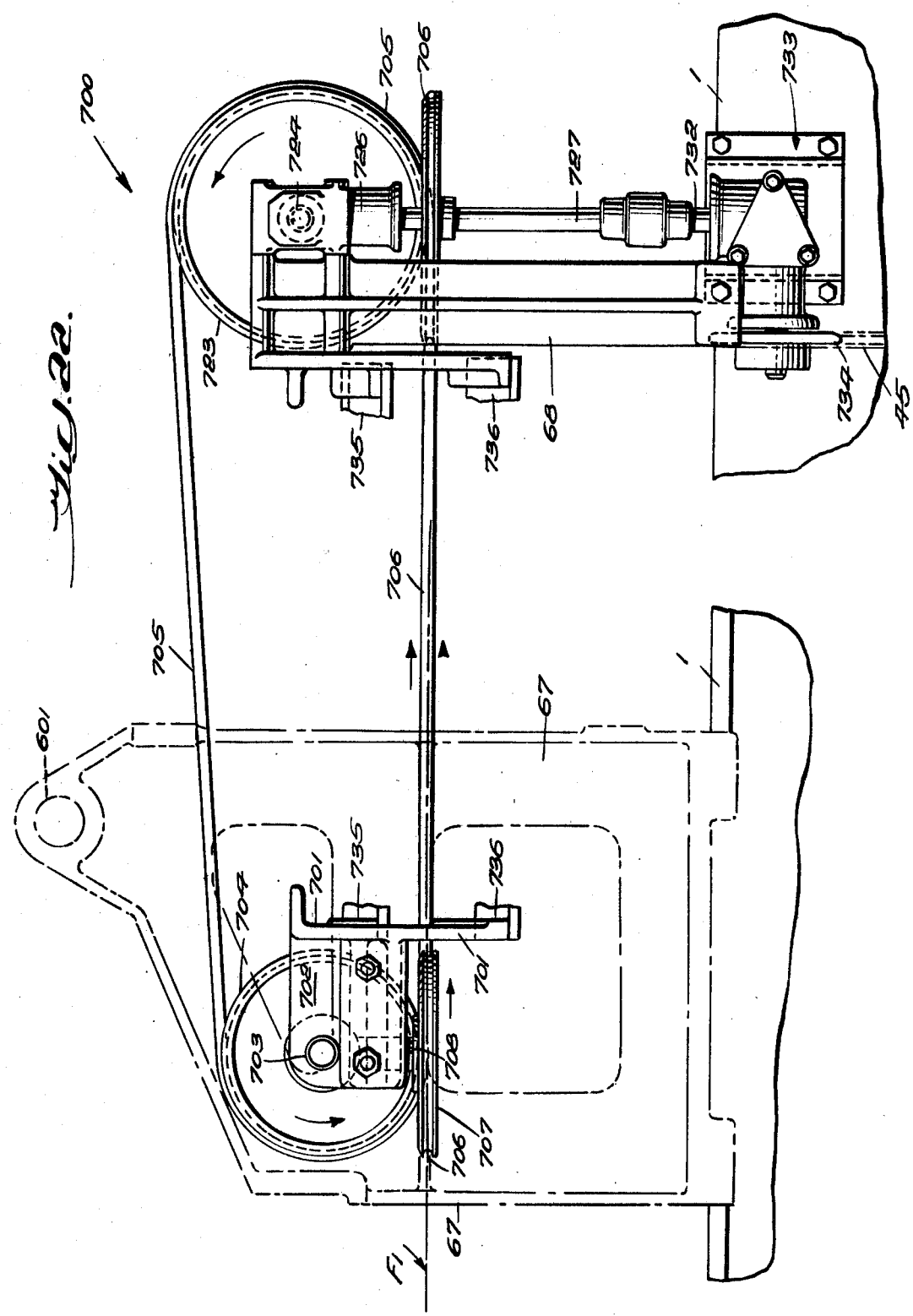

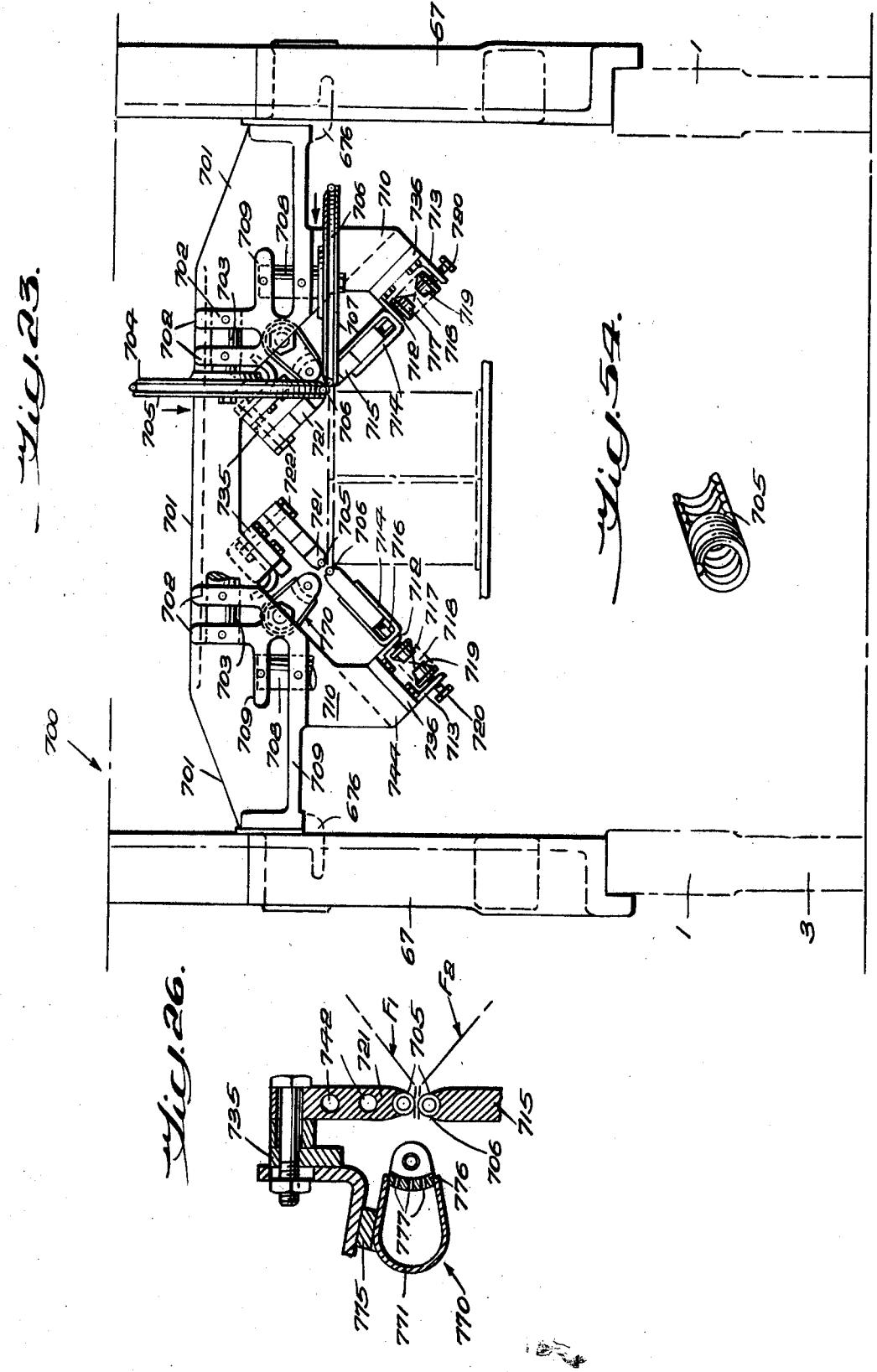

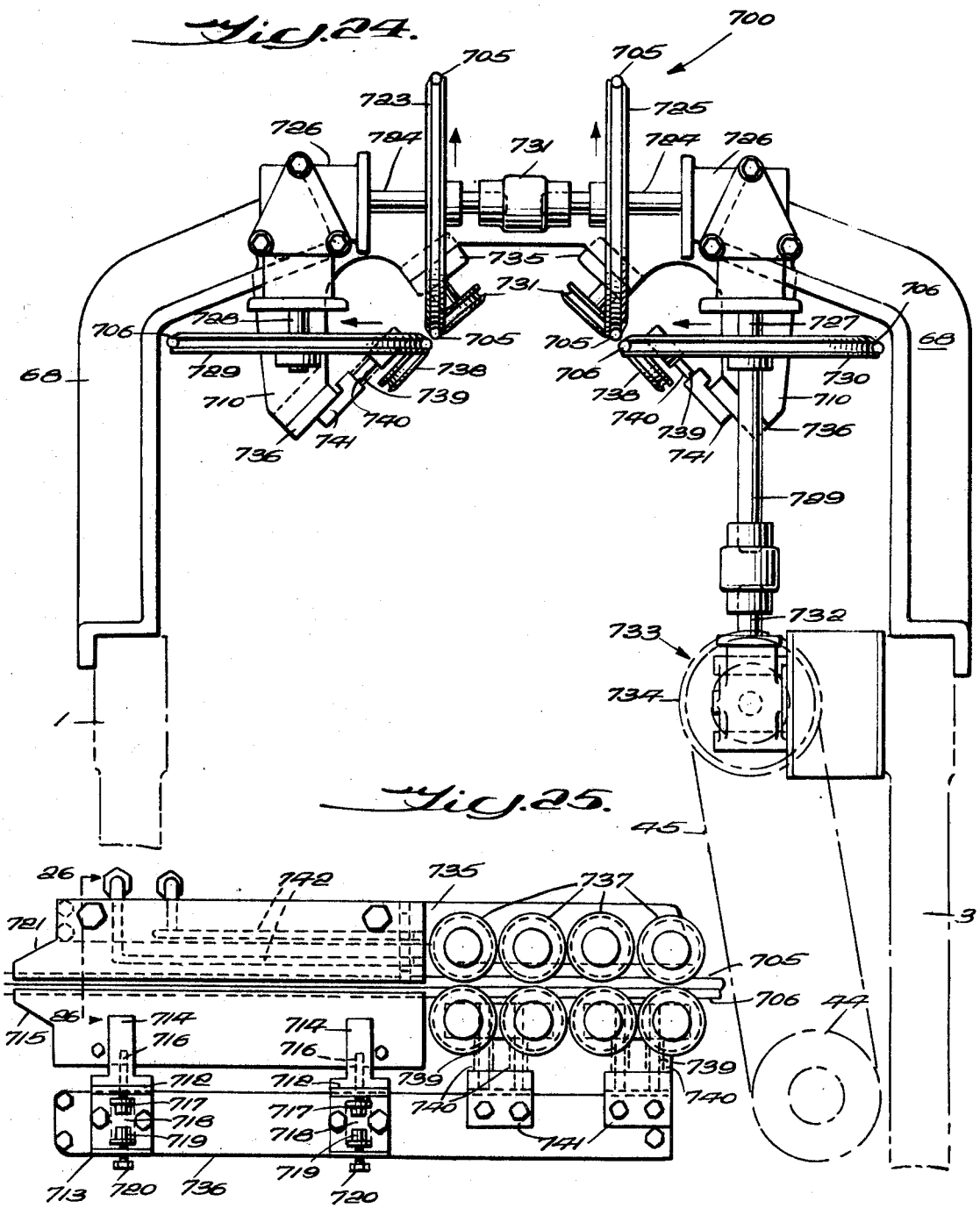

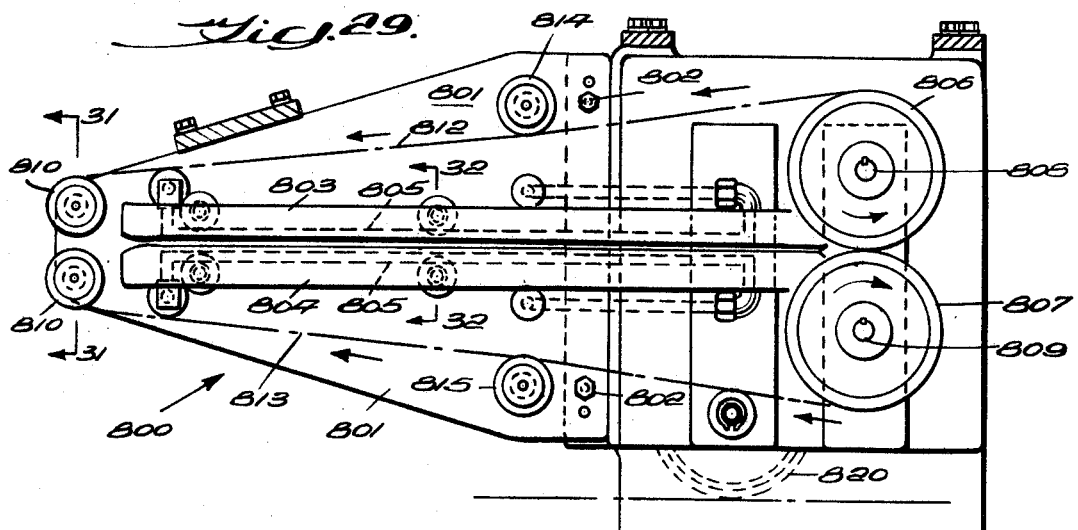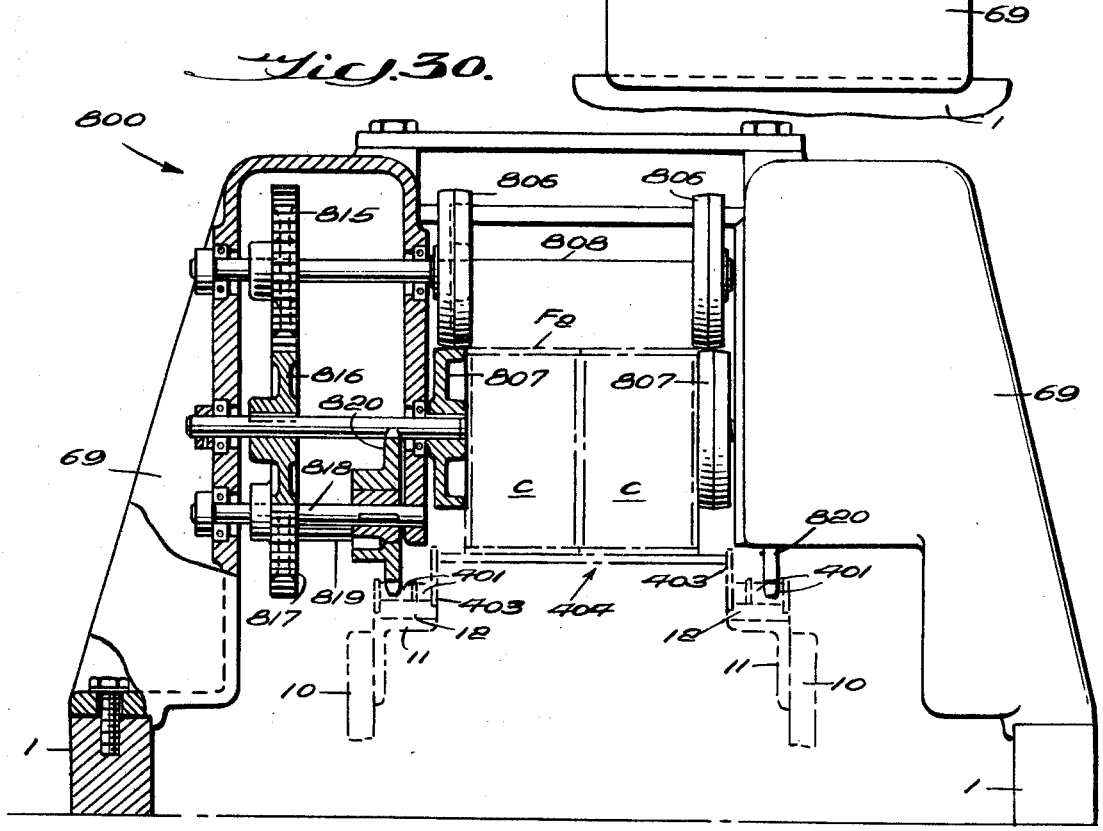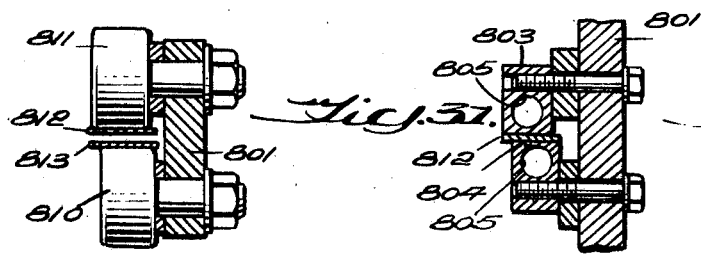

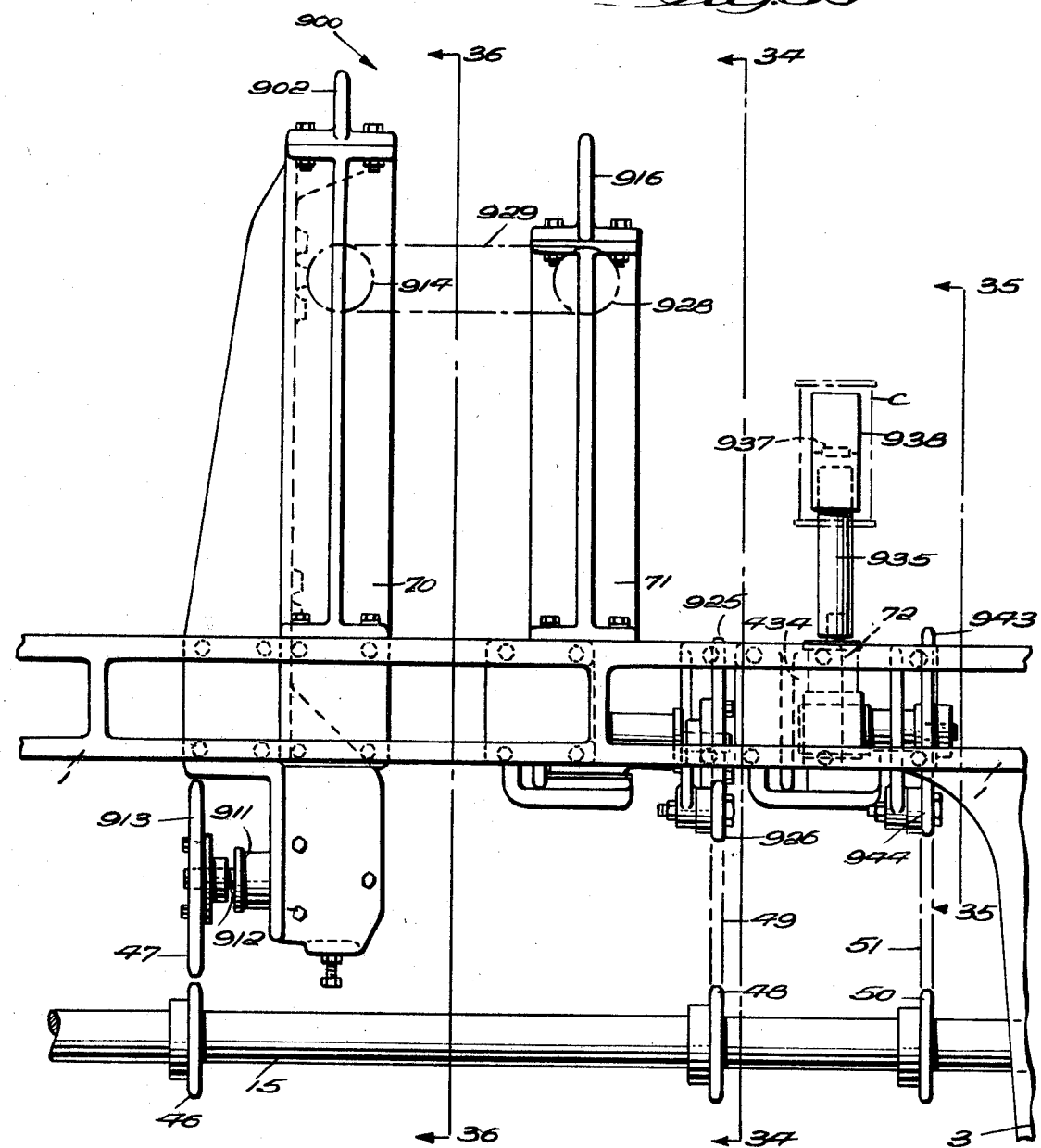

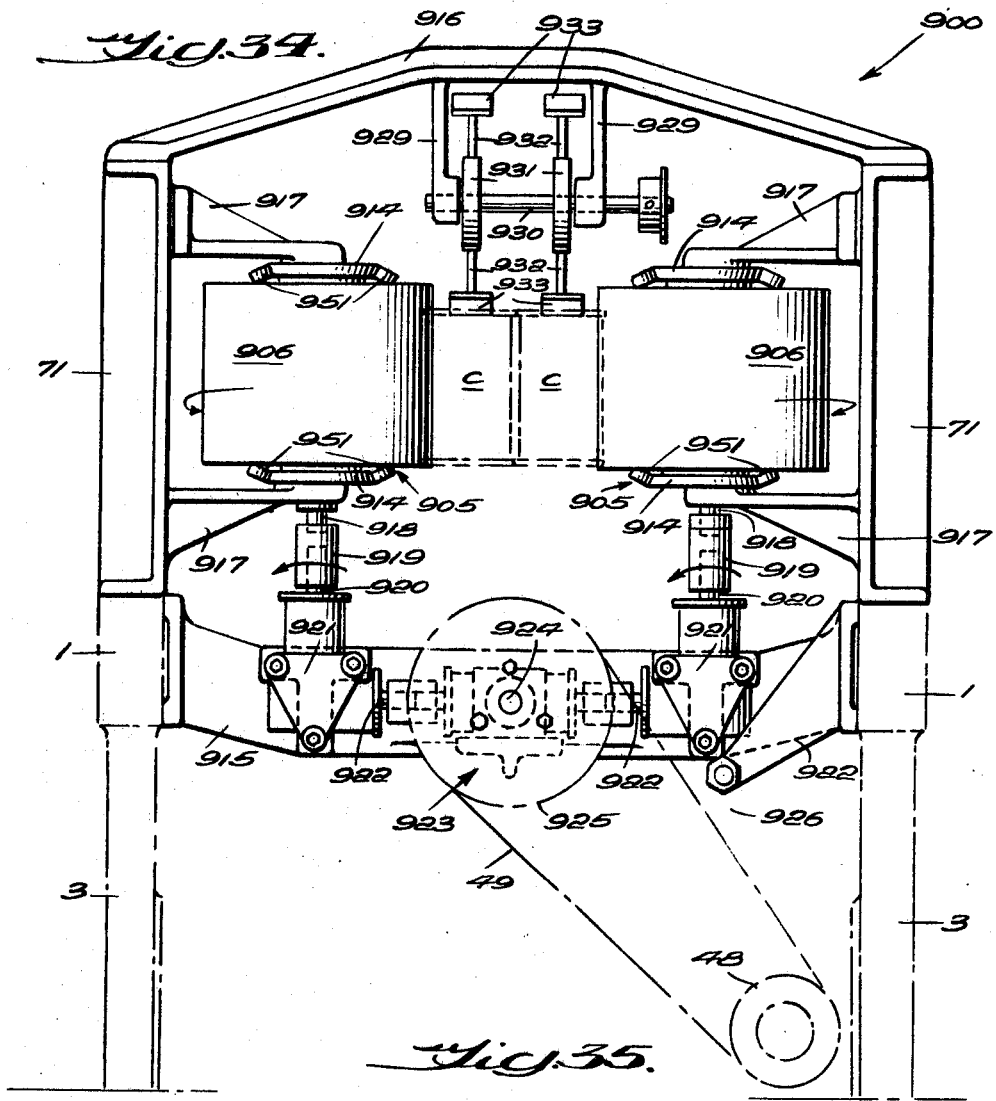
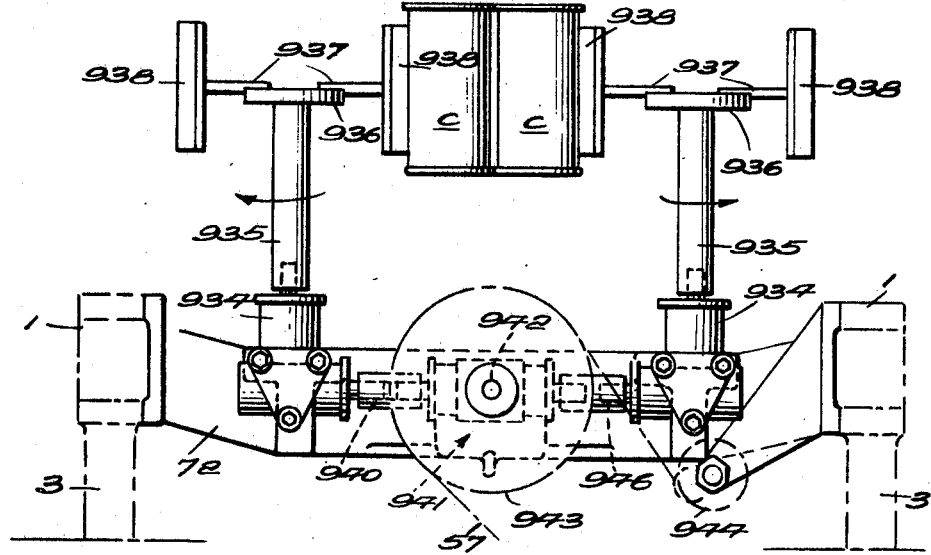

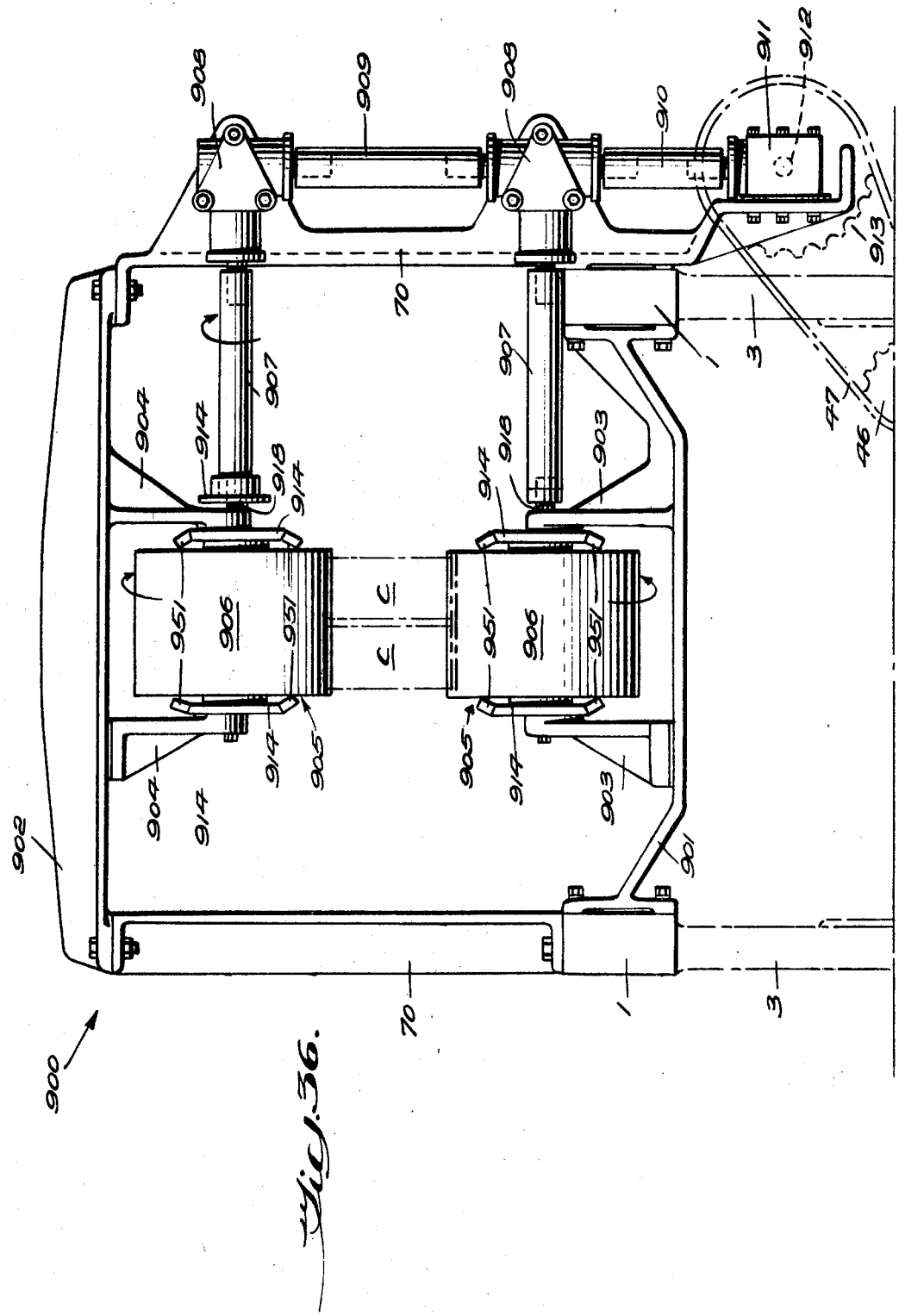

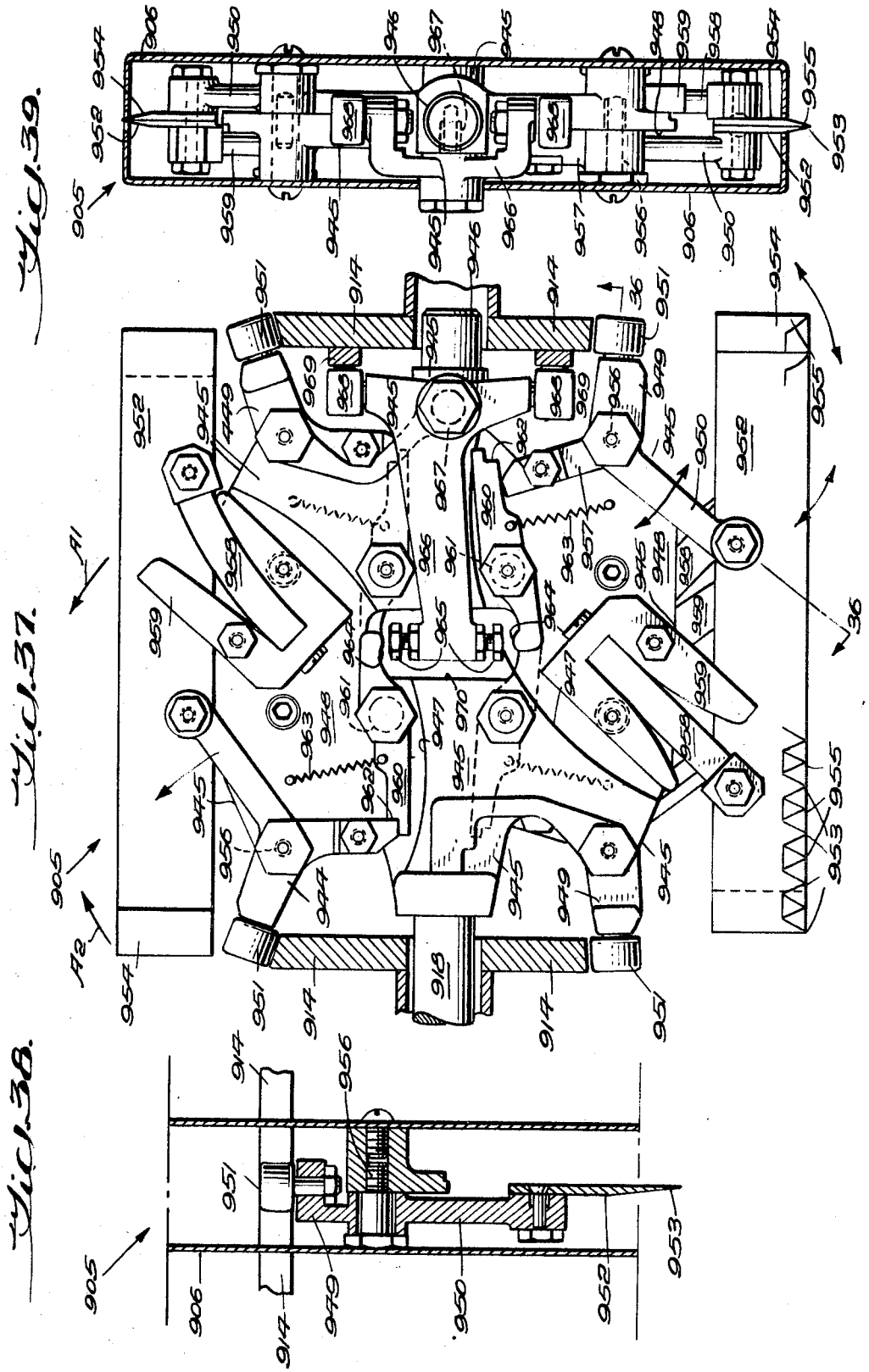

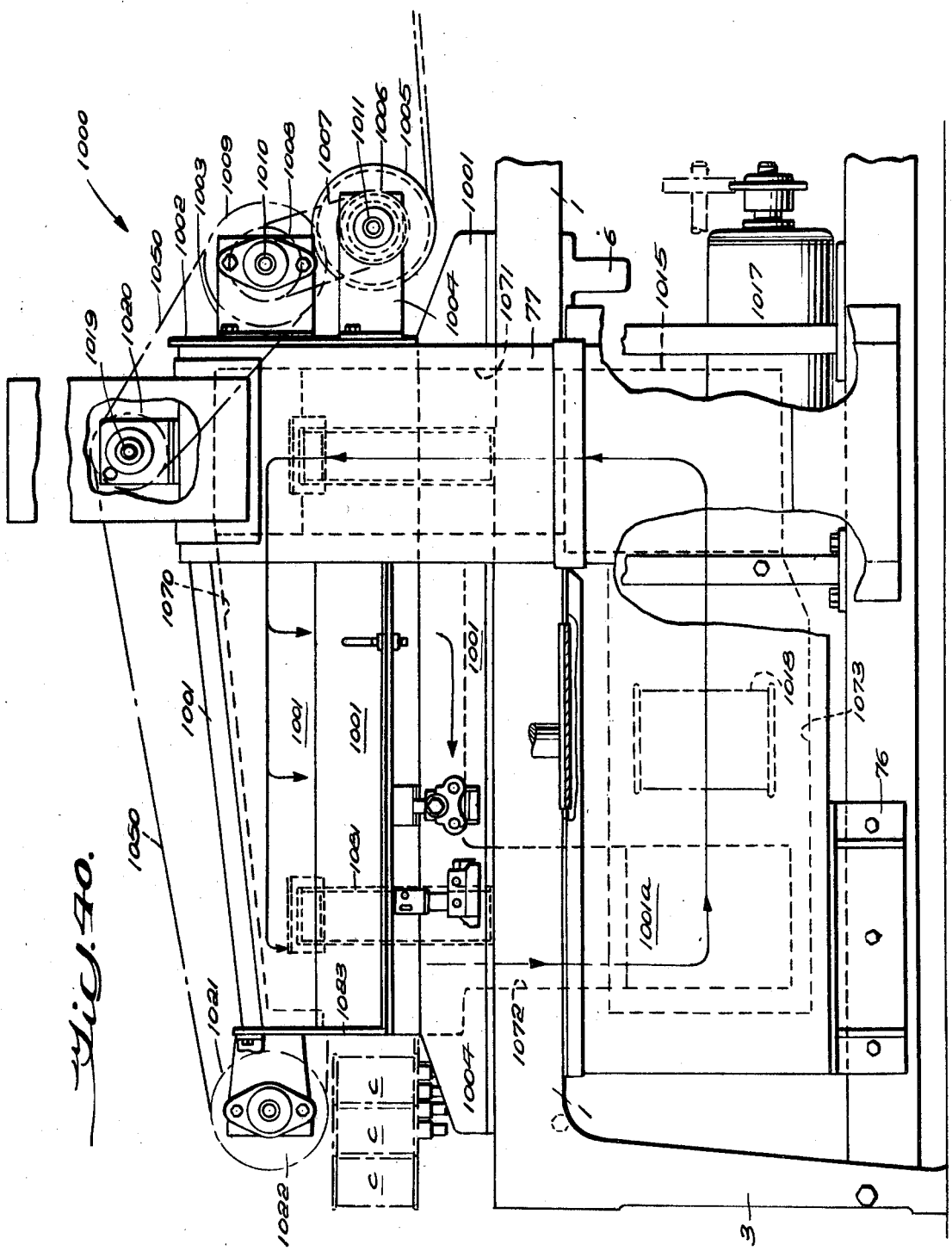

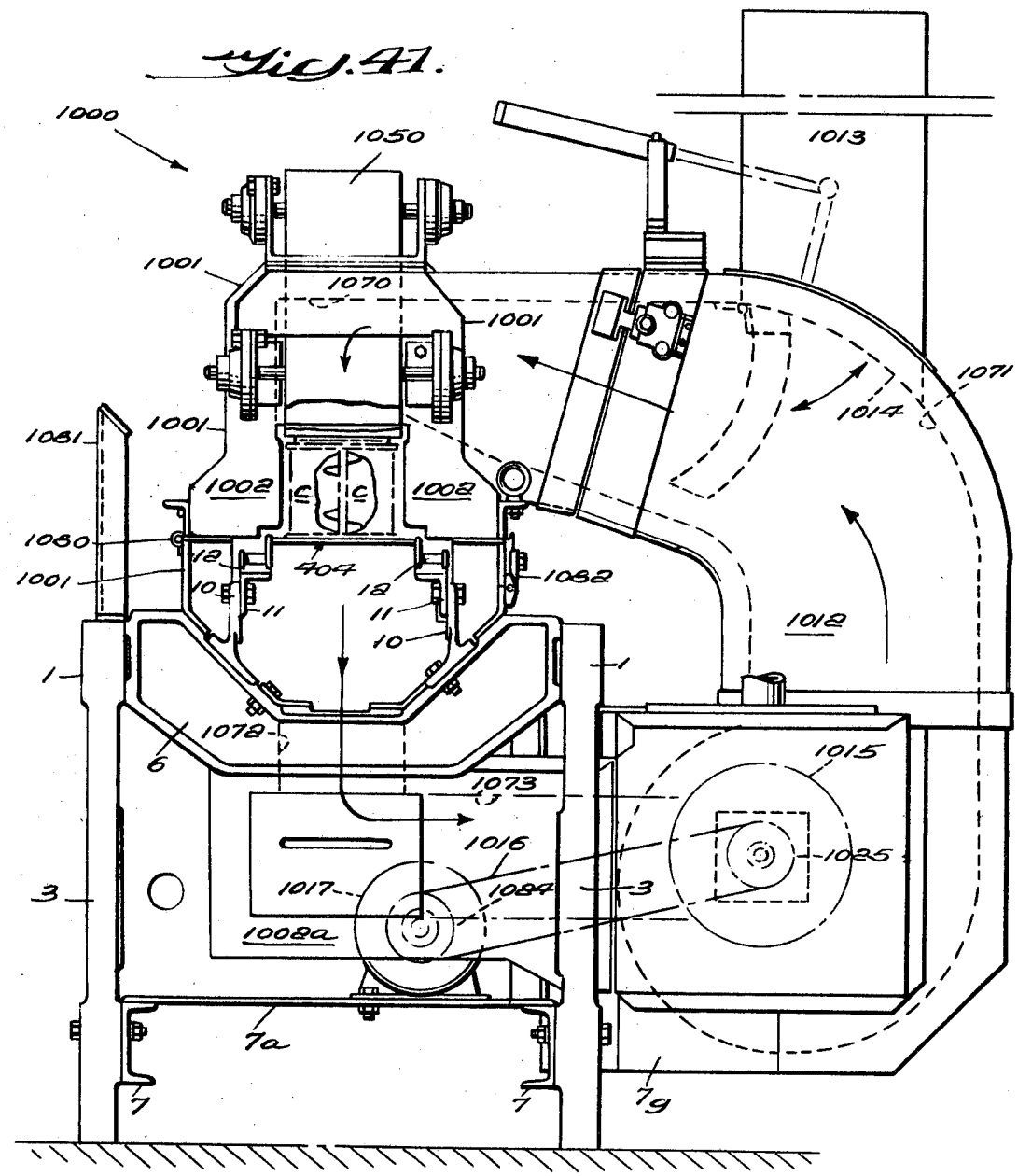

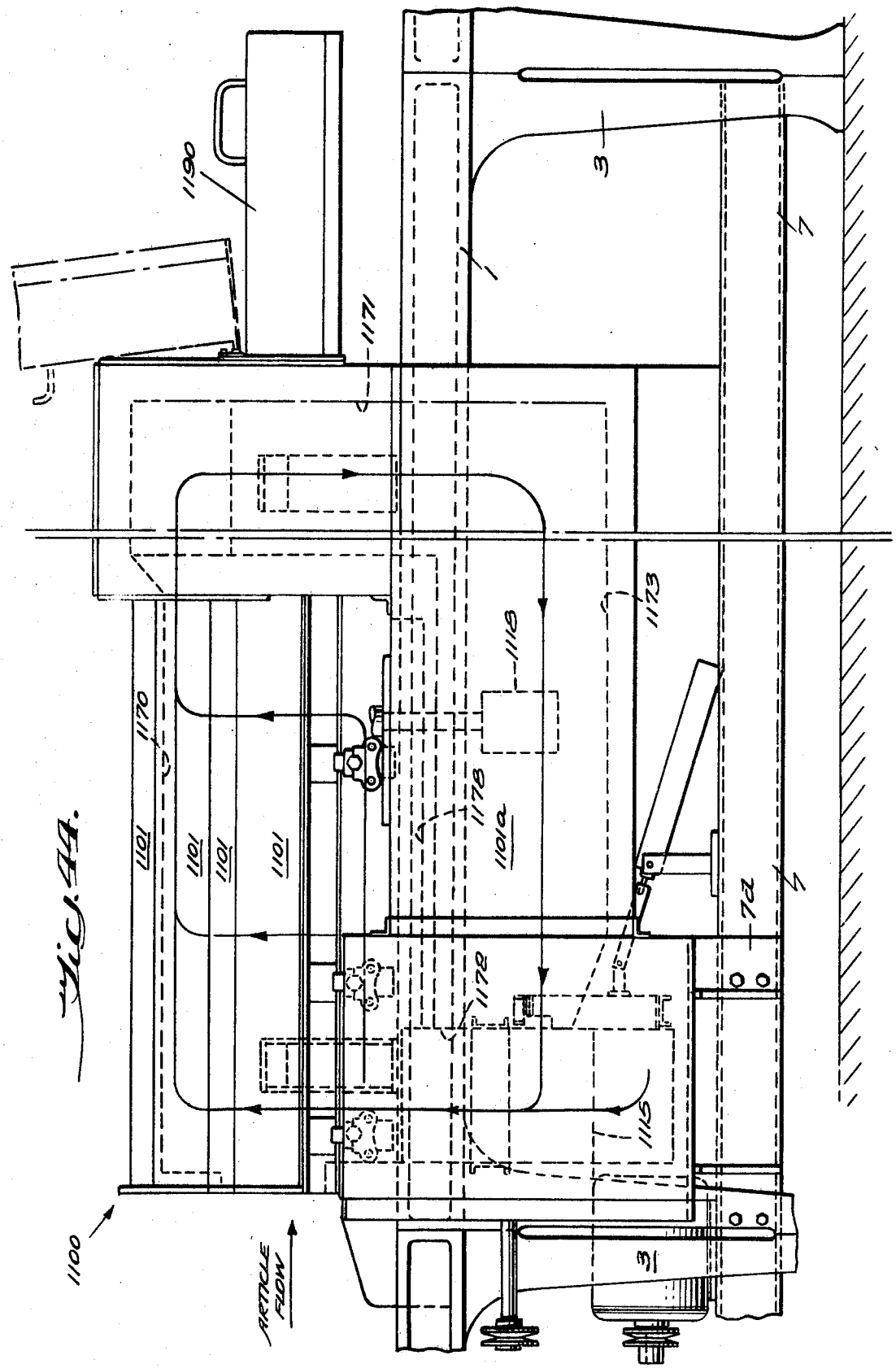

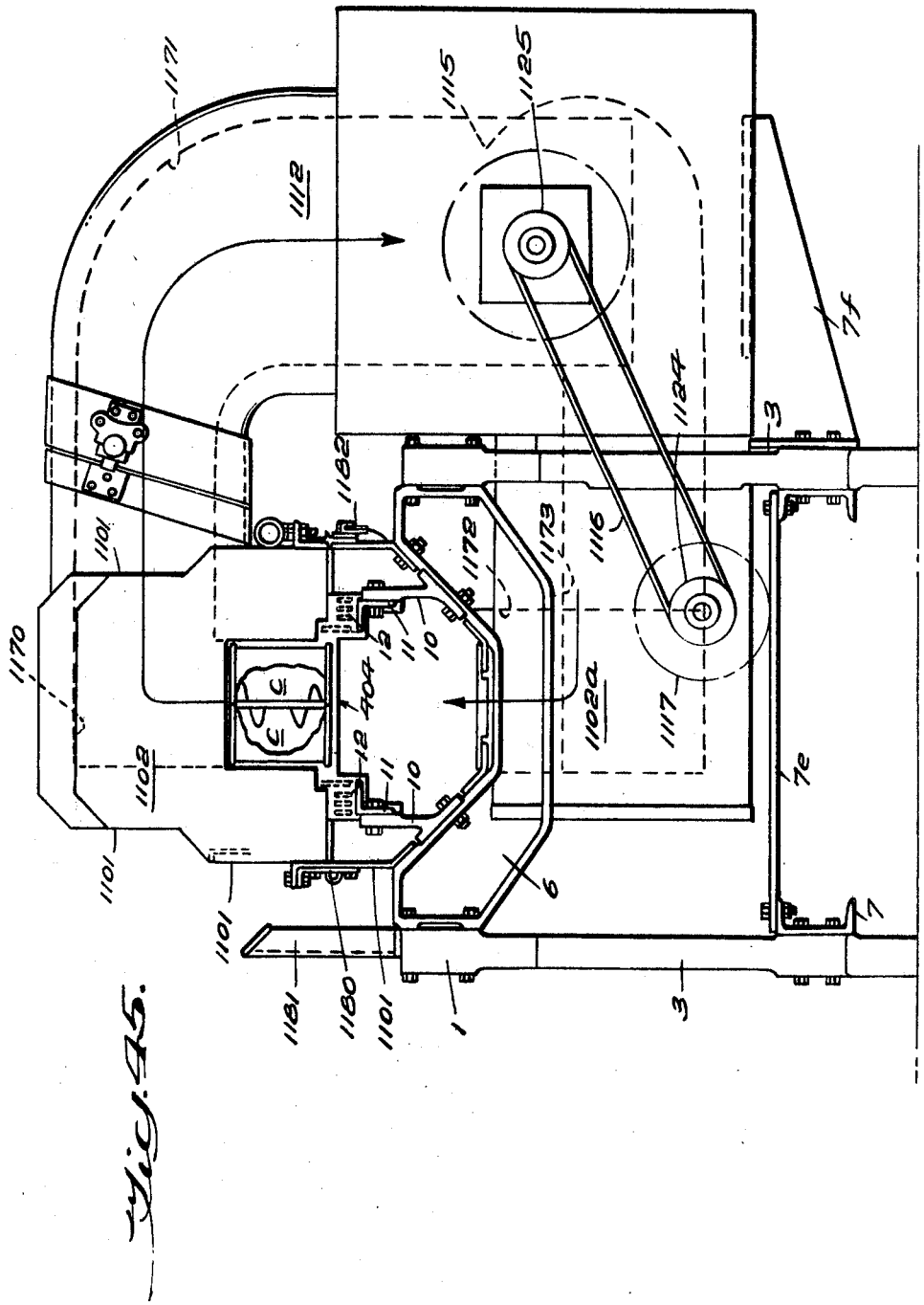

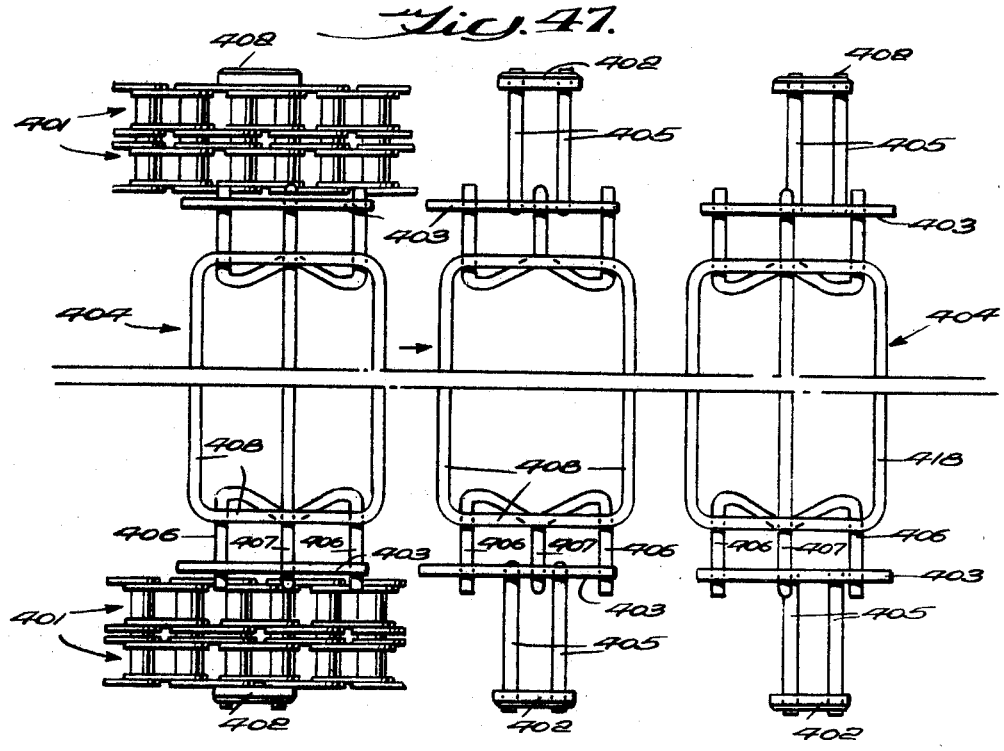
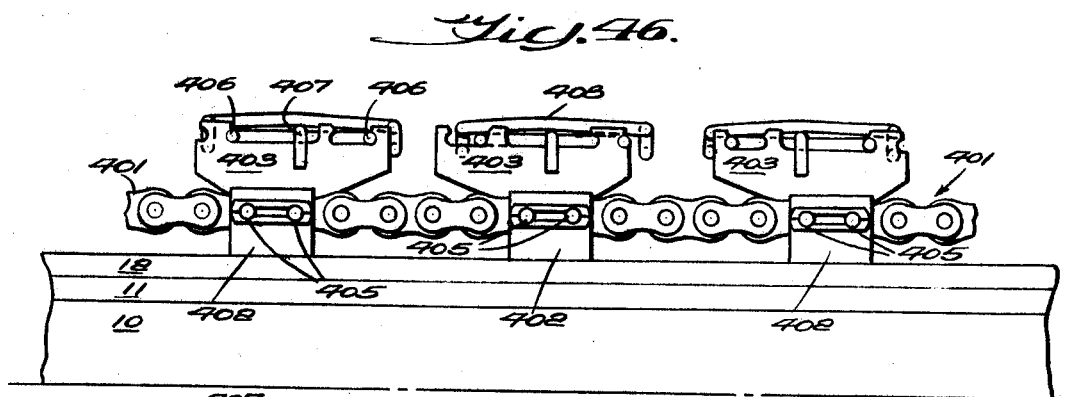
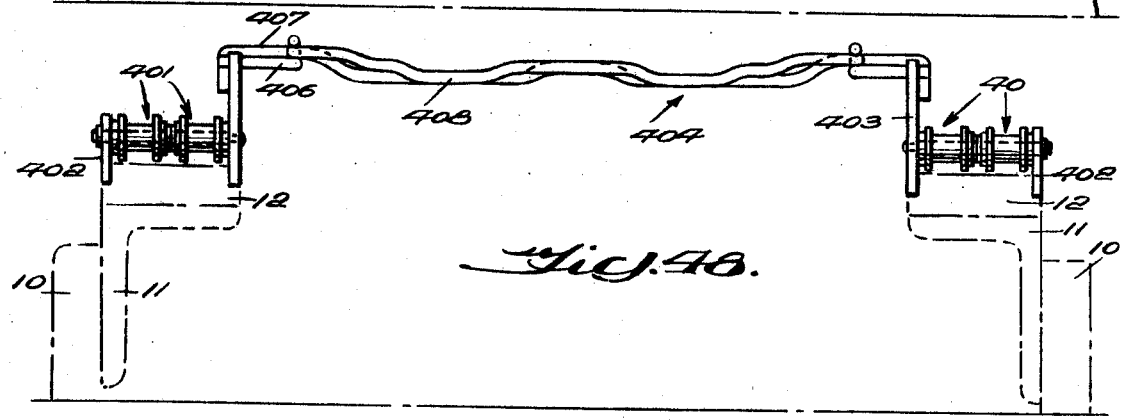

3,513,620
Patented May 26, 1970

1

3,513,620
METHOD AND APPARATUS FOR PACKAGING GROUPS OF ARTICLES IN A TUBULAR SLEEVE
John George Selby Billingsley, Newark, and Jack Edgar Colsen, Hockessin, Del., Edward Stanley Pierce, Sinking Spring, Pa., Harold Eugene Ramsey, Palatine, Ill., and Paul Glenn Stephen, Landenberg, Pa., assignors to E. I. du Pont de Nemours and Company, Wilmington, Del., a corporation of Delaware
Continuation of application Ser. No. 483,945, Aug. 31, 1965. This application Nov. 12, 1968, Ser. No. 778,360
Int. Cl. B65b 21/24, 35/30, 43/08
U.S. Cl. 53—26                                18 Claims

ABSTRACT OF THE DISCLOSURE

A high speed apparatus and process for continuously automatically packaging groups of articles in a tubular sleeve member, involving continuously conveying a plurality of articles from a first position along a given path to a second position, forming said articles into a series of spaced groups, supplying shrinkable film continuously into operative association with said articles, forming the film into an elongated surrounding envelope around said articles, sealing said film to form a unitary sleeve assembly surrounding said articles, severing said sleeve assembly to form individual groups of articles each enclosed by a tubular sleeve member having open end portions, first shrinking the end portions only of the sleeve member to form at least partial end closures therefrom and then shrinking the entire sleeve member into secure engagement with said articles contained in each sleeve member.

---

This application is a continuation of Ser. No. 483,945, filed Aug. 31, 1965, now abandoned.

This invention relates generally to an improved high speed apparatus and method for continuously and automatically packaging groups of articles to form packaged units of increased suitability for efficient handling, transport, and storage. More specifically the invention involves a new and improved high speed apparatus and method arrangement for packaging cylindrical articles such as cans to form six-can packages using continuously supplied flexible heat-sealable and heat-shrinkable film or sheet, preferably of transparent material, in combination with continuously supplied suitable can spacer units, each preferably provided with a manually engageable handle portion for carrying the completed package. The new and improved arrangement is automatic and continuous, receives a continuous stream of regular articles of substantially uniform size, separates the articles into spaced groups, moves said groups of articles continuously from a first position along a given line of movement to a second position, forms continuously supplied flexible film into an elongated surrounding envelope around said groups as the groups move from said first position toward said second position, continuously seals film edges to form a unitary sleeve assembly surrounding said groups as they move toward said second position, continuously severs the sleeve assembly between said groups as they move toward said second position to form individual groups of articles each enclosed by a tubular sleeve member having open end portions, shrinks the open end portions of each sleeve member into engagement with the articles at the ends of the contained group of articles, and then further shrinks each entire sleeve member into close engagement with all of the articles in its contained group.

According to past art, especially that art relating to the formation of packages, such as the six-can packages, the previously known packaging arrangements, which have involved bringing groups of articles and individual pre-

2 formed package units into operative association have not been continuous, but rather intermittent in the operation of at least a number of the significant packaging steps and apparatus components. This has prevented the attainment of high packaging speeds and has resulted in fairly complex indexing mechanisms or drives. In the package resulting from the arrangement of this invention, the articles, or cans, themselves are not only supported and contained thereby, but actually form an integral and necessary part of the package providing structural unity and stability to the otherwise unrelated sleeve member and article spacer unit. The packed articles are a necessary component of the package so that the placing and securing of the articles into proper position with respect to each other and the package components must be carried out substantially concurrently to effect formation of the package. The conventional approach of separately forming package units and separately forming groups of articles and then combining formed groups with more or less completely formed package units in a later stage or step cannot be followed in making the package according to this invention, and no effective, high speed approach appears to be known to the art for making such packages.

It is an object of this invention to provide a new improved arrangement of steps and of means to accomplish continuous, automatic, more rapid and effective formation of grouped article packages.

It is another object of the invention to provide new and improved component means and component steps for contributing to the function of the overall combination or arrangement.

It is another object of the invention to provide such an arrangement of means, and arrangement of process steps which is effective, reliable, flexible in operation, yet reasonably economical to fabricate, operate, maintain, and repair.

Other objects and advantages will appear from a consideration of the following specification, the claims, and the accompanying drawings in which:

FIG. 1 is a diagrammatic, somewhat schematic perspective view illustrating the general features and relationship of the components of an arrangement embodying principles of the invention.

FIG. 2 is a perspective view of the package of articles formed by the preferred form of packaging arrangement of the invention.

FIG. 3 is a transverse cross-sectional view of the partially completed package structure prior to the seam sealing, cutting and shrinking treatments, illustrating the arrangement of the film components which form the package.

FIG. 4 is a view of the structure shown in FIG. 3 after the seam sealing, cutting, and shrinking treatments which complete the formation of the package.

FIGS. 5a, 5b, 5c, 5d, and 5e form a composite side elevational view of a packaging apparatus embodying principles of the invention.

FIG. 6 is a transverse cross-sectional view of the apparatus of FIG. 5 taken at line 6—6 of FIG. 5b.

FIGS. 7a and 7b form an enlarged composite partial view of the input end of the apparatus of FIG. 5 illustrating the features of the article or can spacer unit feed mechanism.

FIGS. 8a and 8b form an enlarged partial plan view of the article or can spacer unit feed mechanism of FIG. 7.

FIG. 9 is an enlarged partial view of the right hand end of the can spacer unit feed mechanism as viewed in FIG. 7.

FIG. 10 is an enlarged partial view of the left hand end of the can spacer unit feed mechanism as viewed in FIG. 7.

Figure 11:
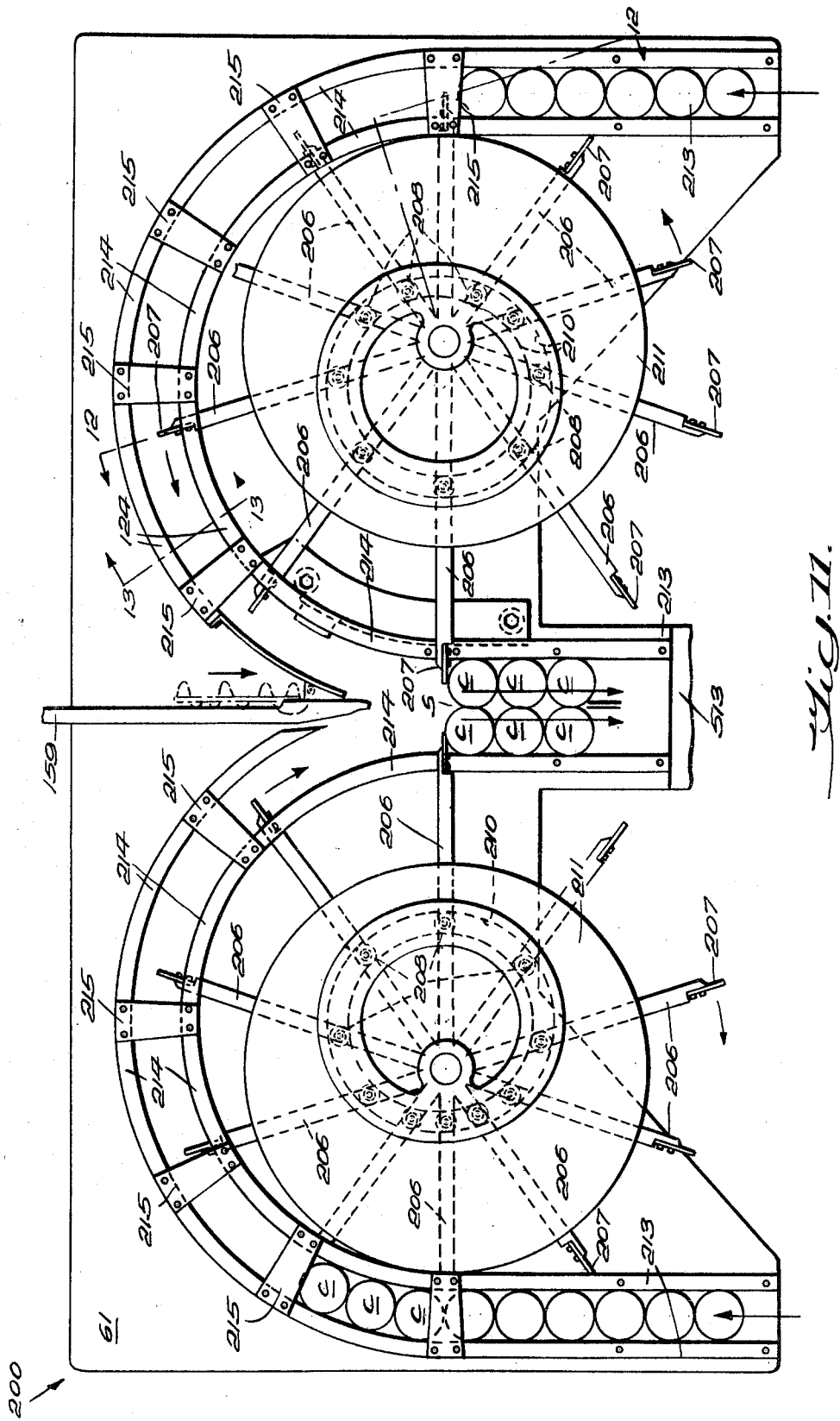

FIG. 11 is a partial plan view of the inlet end of the apparatus shown in FIG. 5a illustrating the main features of the article or can feed and grouping mechanism.

FIG. 12 is a partial sectional partial side elevational view of the mechanism of FIG. 11 taken at line 12—12.

FIG. 13 is a partial enlarged vertical cross-sectional view taken at line 13—13 of FIG. 11.

FIG. 14 is an enlarged partial side elevational view of the apparatus showing the bottom film feeding and initial package forming mechanism and its relationshp with the can group transfer mechanism.

FIG. 15 is a partial plan view of the structure of FIG. 14.

FIG. 16 is a parital view of the right hand end of the structure shown in FIG. 14.

FIG. 17 is an enlarged front view of one of the tenter clip devices employed in the bottom film feeding and initial package forming mechanism shown in FIGS. 14, 15, and 16.

FIG. 18 is a side elevational view of the tenter clip device shown in FIG. 17.

FIG. 19 is an enlarged partial side elevational view of the top film feeding mechanism.

FIG. 20 is an enlarged partial plan view of the mechanism of FIG. 19.

FIG. 21 is an enlarged partial sectional end view of the structure of FIG. 19 taken on line 21—21 of FIG. 19.

FIG. 22 is an enlarged partial side elevational view of the heat sealing mechanism for forming the longitudinal seams joining the top and bottom film elements to complete the unitary sleeve assembly.

FIG. 23 is an enlarged partial view of one end of the mechanism of FIG. 22.

FIG. 24 is an enlarged partial view of the other end of the mechanism of FIG. 22.

FIG. 25 is a partial cross-sectional view taken at line 25—25 of FIG. 22.

FIG. 26 is a partial cross-sectional view taken at line 26—26 of FIG. 22.

FIG. 27 is an enlarged partial plan view of the burner unit component of the heat sealing mechanism shown in FIG. 22.

FIG. 28 is an enlarged partial end view of the burner unit component shown in FIG. 27.

FIG. 29 is an enlarged partial side elevational view of the seam cooling and clamping mechanism of the apparatus embodying the present invention.

FIG. 30 is an enlarged partial end view of the mechanism shown in FIG. 29.

FIG. 31 is a partial cross-sectional view taken at line 31—31 of FIG. 29.

FIG. 32 is a partial cross-sectional view taken at line 32—32 of FIG. 29.

FIG. 33 is an enlarged partial side elevational view of the sleeve assembly cutter mechanism of the apparatus of the present invention.

FIG. 34 is a partial cross-sectional view taken at line 34—34 of FIG. 33.

FIG. 35 is a partial cross-sectional view taken at line 35—35 of FIG. 33.

FIG. 36 is a partial cross-sectional view taken at line 36—36 of FIG. 33.

FIG. 37 is an enlarged partial plan view of one of the several cutter devices of the cutter mechanism shown in FIG. 33.

FIG. 38 is a partial cross-sectional view of the cutter device of FIG. 37 taken at line 38—38.

FIG. 39 is a partial view of one end of the cutter device of FIG. 37.

FIG. 40 is an enlarged partial side elevational view of the package end shrinking mechanism of the package forming apparatus embodying principles of this invention.

FIG. 41 is an enlarged partial view of the right hand end of the mechanism shown in FIG. 40.

FIG. 42 is an enlarged partial plan view of a portion of the heat shielding endless belt member of the package end shrinking mechanism of FIG. 40.

FIG. 43 is an enlarged partial view of the edge of the portion of the belt member shown in FIG. 42.

FIG. 44 is an enlarged partial side elevational view of the total package shrinking mechanism of the apparatus of this invention.

FIG. 45 is an enlarged partial view of the right hand end of the mechanism shown in FIG. 44.

FIG. 46 is an enlarged partial side elevational view of the endless chain conveyor assembly of the apparatus embodying principles of this invention.

FIG. 47 is a partial plan view of the endless chain conveyor assembly shown in FIG. 46.

FIG. 48 is an end view of the conveyor assembly shown in FIG. 46.

Figure 49:
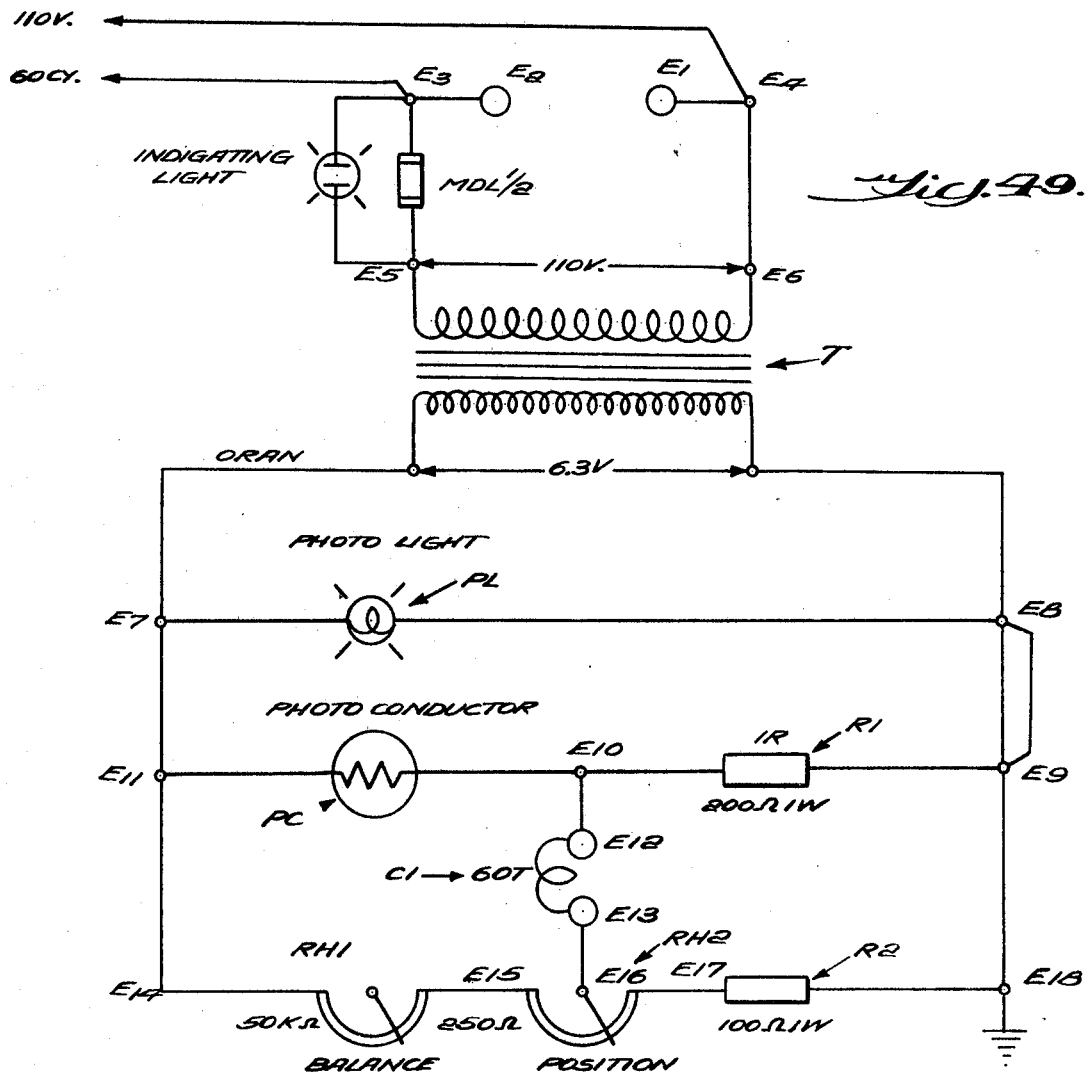

FIG. 49 is a schematic diagrammatic view showing the general circuit arrangement for the mechanism which controls the lateral position of the film rolls.

Figure 50:
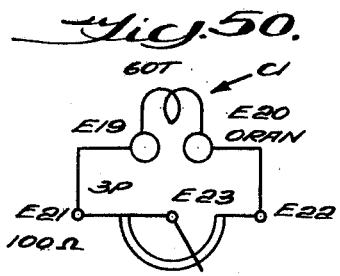

FIG. 50 is a schematic diagrammatic view showing the sensitivity adjustment circuit used in conjunction with the arrangement of FIG. 49.

Figure 51:
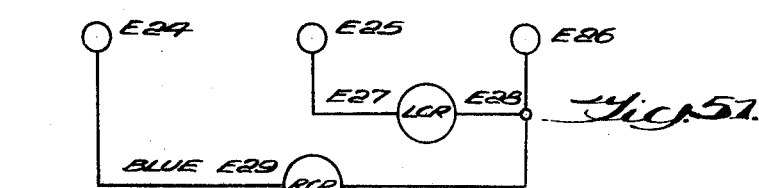
Figure 52:
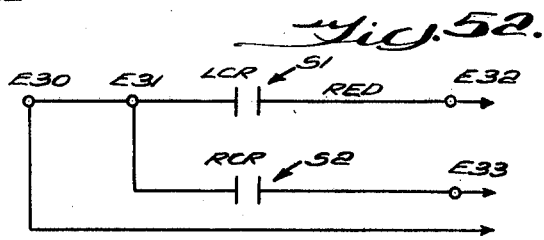

FIGS. 51 and 52 are schematic diagrammatic showings of the film roll positioning motor circuits used in conjunction with the circuit of FIG. 49 for controlling the lateral position of the film edge and roll.

FIG. 53 is a partial longitudinal cross sectional view of the top film roll chuck unit.

FIG. 54 is a partial perspective view of the endless helical wire conveyor member of the seam sealing means.

The overall action of the method and apparatus embodying principles of this invention is illustrated very generally in FIG. 1 in which a continuous stream of articles C are received and arranged in spaced groups by can supply units 200, which groups are combined with article spacer or separator elements continuously supplied from separator supply unit 100, and moved in the direction indicated along a given path of movement by a main conveyor unit 400. Concurrently, flexible shrinkable film, BF or $F_1$, is continuously supplied from a bottom film supply unit 300 and a similar film, TF or $F_2$, is continuously supplied from a top film supply unit 600 and formed into an elongated surrounding envelope around the groups of articles as the groups move along the path of movement established by the main conveyor unit 400. The edges of the film are continuously sealed by the flame sealer and bead, or seam, cooler units, 700 and 800, to form a unitary sleeve assembly surrounding the groups as they are moved by the main conveyor unit. The unitary sleeve assembly is severed between the moving groups by the action of the horizontal and vertical cutter units 900 to form individual groups of articles engaging a separator element and enclosed by a tubular sleeve member having open end portions. The individual groups of articles each enclosed by a tubular sleeve member are treated by an end shrink oven unit 1000 to shrink the open end portions of each sleeve member into engagement with the articles at the ends of each contained group of articles and then the groups of articles each surrounded by a sleeve member are further treated in total shrink oven unit 1100 to shrink each entire sleeve member into close engagement with all of the articles in its contained group.

A completed package prepared according to a preferred embodiment of this invention is shown in FIG. 2, in which the articles or cans C can be seen surrounded by the sleeve member with its open end shrunk into engagement with the articles at the ends of the package. The article spacer or separator unit S with the manually engageable carrying handle SH is also visible in this figure.

FIG. 3 shows an end view of a group of articles surrounded by the elongated envelope of film before the film is sealed to form the unitary sleeve assembly.

FIG. 4 is a view similar to FIG. 3 showing the group of articles surrounded by the severed sleeve member after it has been shrunk into engagement with the articles contained therein.

As shown generally in FIGS. 5a, 5b, 5c, 5d, 5e and 6, the apparatus of this invention comprises an elongated supporting frame structure formed from individual units each comprising vertical leg elements 3 interconnected at their upper extremities by longitudinally extending horizontal elements 1 and transversely extending horizontal elements 6. Certain of the supporting frame units are provided with additional longitudinally extending horizontal elements 7 interconnected with the leg elements 3 near their lower extremities. The transversely extending elements 6 are provided with opposing upwardly projecting brackets elements 10 to which are secured, by suitable means, elongated longitudinally extending parallel support elements 11. Mounted on support elements 11 and secured thereto by suitable means are parallel horizontal longitudinally extending track or guide elements 12 which engage, support and guide two spaced endless main conveyor chain assemblies 401, shown in an enlarged view in FIGS. 46, 47, and 48. The main conveyor chain assemblies 401 carry between them transversely extending article conveyor racks 404. At each end of the parallel track elements 11 and in operative alignment therewith are a pair of spaced sprocket wheels 24 rotatably mounted in the supporting frame structure. The two endless conveyor chain assemblies 401 extend along the horizontal track elements 12, around the sprocket wheels 24, and along the lower portion of the supporting frame structure where they are engaged and supported by idler wheels 52. The spaced sprocket wheels 24 at the right hand end of the apparatus as viewed in FIG. 5e are driven in the direction indicated by the arrows in FIG. 5e by means of another sprocket wheel 23 rigidly connected to the shaft on which sprocket wheels 24 are rigidly mounted. Sprocket wheel 23 engages an endless drive chain 22 driven by sprocket wheel 21 which is driven from a longitudinally extending horizontal rotary drive shaft 15 through a direction changing gear box 20 mounted on transversely extending platform comprising elements 8 and 9 mounted on the lower longitudinal elements 7 of the supporting frame structure. As viewed in FIGS. 5a, 5b, 5c, 5d, and 5e, the upper portions of the endless conveyor chain assemblies, supported and guided by track elements 12, and carrying article conveyor racks 404, move from left to right. Rotary drive shaft 15 is rotatably supported by bearing units 14 secured by suitable means to vertical leg elements 3, as best seen in FIG. 6. The drive shaft 15 itself is driven by a suitable drive motor 16 (FIG. 5b) mounted on a transversely extending platform comprising elements 8 and 9 mounted on the lower longitudinal elements 7 of the supporting frame structure, through motor shaft 17, sprocket 19 rigidly carried by shaft 17, and drive chain 18 connecting sprocket 19 with a sprocket (not shown) rigidly attached to shaft 15. Shaft 15 supplies driving power to various component mechanisms mounted along the supporting framework, either directly by sprocket and chain drive arrangements, or indirectly by sprockets rotated by engagement with the conveyor chain assemblies 401 so that the actions of the components are properly synchronized for continuous automatic operation.

Referring to FIGS. 5a, 5b, 5c, 5d, and 5e, starting with FIG. 5a, a laterally widened portion of the supporting frame structure comprising leg elements 4 and interconnected horizontal elements 5, supports a power control panel CP for the apparatus, and also supports a separator or spacer unit feed means 100 by means of support brackets 63. An article feed and group forming means 200 is supported on the frame structure by means of bracket 60 and plate 61. A bottom film feeding and initial package forming means 300 comprises a pair of swingable arms 321 pivotably mounted on shaft 320 carried by the supporting frame structure for holding a roll of film 324 in operative engagement with a rotatable friction drive roll 31 also mounted on the frame structure. The swingable arms are provided with a counterweight assembly comprising arm 325 and counterweight 326 for urging the film roll 324 into constant driving engagement with the drive roll 31. The bottom film feeding and initial package forming means 300 further comprises a horizontally and longitudinally disposed film edge gripping and feeding mechanism extending generally between element 312 and element 308 as seen in FIGS. 5a and 5b and supported on the frame structure by brackets 65, 66, 73, and 75.

An article or can group transfer means 500, for transferring or moving groups of articles from the article feed and group forming means 200 into engagement with the bottom film and the article conveyor racks 404 of the conveyor chain assembly, is mounted on the supporting framework by brackets 65 and 66.

A top film feeding means 600 is mounted on bracket 67 carried by the supporting frame structure and cooperates with a film seam sealing means 700 carried by brackets or support elements 67 and 68. A seam cooling and clamping means 800 is mounted on support elements or brackets 69 which are secured to the supporting frame structure. A sleeve severing means 900 is carried on the supporting frame structure by means of brackets 70, 71, and 72. The next component positioned along the elongated frame structure and the main conveyor path of movement is the package end shrinking means 1000, which is adjacent the total package shrinking means 1100, which carried out the final step to complete package formation.

With regard to the supply of driving power to the various component means, a shaft 33 of the separator unit feed means is provided with a driven gear 32 at its lower end which meshes with another gear carried by transverse shaft 58 on which the friction drive roll 31 for film roll 324 is mounted. Shaft 58 and the drive roll 31 are driven by a toothed belt 30 driven by a sprocket wheel 28 carried by a transverse shaft 29 which is driven by a chain 27 connecting a sprocket wheel or shaft 29 with a sprocket wheel 26. Sprocket wheel 26 is driven from shaft 15 through a direction changing gear box 25 mounted on the supporting frame structure. Shaft 29 also drives gears fixed to shafts 201 of the article feed and group forming means 200. As shown in FIG. 5b, shaft 15 carries a sprocket wheel 34 which drives a sprocket wheel 36 on gear box 37 by means of drive chain 35. Sprocket 38 of gear box 37 drives sprocket 391 of the film gripping and feeding mechanism of bottom film supply means 300, and also drives sprocket 40 of the article group transfer means 50. In addition, sprocket 38 drives sprocket 43 of the top film feeding means through chain 42 and sprocket 41 rigidly connected to sprocket 40. A driving connection to the seam sealing means 700 is provided by means of sprocket 44 on shaft 15 and drive chain 45. Rotary driving power is provided to seam cooling and clamping means 800 by means of a sprocket wheel 820 engaged with the main conveyor chain assemblies 401. The sleeve severing means 900, which comprises the horizontal cutter units, vertical cutter units, and their associated clamping mechanisms, receives driving power by means of sprocket wheels 46, 48, and 50 mounted on shaft 15 and their associated chains 47, 49, and 51. A driving connection to the package end shrinking means 1000 is provided by sprocket wheel 1005 which engages the main conveyor chain assembly 401.

Turning now to a more detailed description of the component means of the apparatus of this invention, the spacer or separator unit feed means 100 is shown in detail in FIGS. 7a, 7b, 8a, 8b, 9, and 10. The separator unit feed means or component 100 is located at the inlet or left hand end of the machine as viewed in FIG. 5a, and is supported by bracket members 63. This component means comprises a plate member 64 suitably mounted on the bracket member 63. This plate member 64 is provided with an elongated slot 190 extending transversely relative to the overall apparatus. A pair of brackets 121 are mounted on the upper side of member 63 adjacent one end of the slot 190 and each carries a bearing support element 122 in which elements is mounted a rotary shaft 129 carrying a pulley wheel 123. Adjacent the other end of slot 190 is mounted a corresponding pair of brackets 131, each carrying a bearing support element 132 in which elements are mounted a rotary shaft 133 carrying a pulley wheel 134. An upper endless belt member 124 is carried by pulley wheels 132 and 134 and is provided with a plurality of elements secured to the belt member and carrying a plurality of flexible resilient bristles extending generally perpendicularly to the plane of the belt as seen in FIGS. 7a and 7b. A pair of bearing support elements 127 are mounted on the under side of plate member 64 adjacent the one end of slot 190 and generally under brackets 121. In bearing support elements 127 is mounted a rotary shaft 130 carrying a pulley wheel 128 below plate member 64. Another pair of bearing support elements 137 are mounted on the underside of plate member 64 adjacent the other end of the elongated slot 190. A rotary shaft 133 carrying a pulley wheel 136 is mounted in bearing support elements 137. A lower endless belt member 124 of similar construction to the upper belt member is carried by pulley wheels 128 and 136. The belt members are driven in opposite directions as shown by the arrows in FIGS. 7a and 7b so that opposed adjacent portions of the belt members act as a resilient overriding frictional conveyor to engage and move a horizontally disposed nested plurality of separator units S transversely of the apparatus toward pulley wheels 134 and 136 and away from pulley wheels 123 and 128 as viewed in FIGS. 7a and 7b. The belt members are driven at a predetermined constant speed by means of a sprocket wheel 138 on shaft driven by a belt which is in turn driven by a sprocket wheel 140 on the shaft of a suitable motor 142 (FIGS. 8a and 10) which is mounted on support element 143 carried by plate member 64. Shafts 133 and 147 are connected by means of cross shaft 145 and bevel gear boxes 144 and 146. As the nested separator units S move toward pulley wheels 134 and 136, they are guided at their corners by horizontally extending guide rails elements 156, 157, 107, and 108 which are carried by plate element 101 and support elements 105. As shown in FIGS. 7b, 8a, and 10, each bracket 131 carries an upper rotary feed screw 144 and a parallel lower rotary feed screw 144, all aligned and cooperating with the endless belt members 124 to receive separator units therefrom and continue the separator unit motion transversely of the apparatus by means of engagement of the edges of the separator units with helical fins or threads on the rotating feed screws. As seen in FIGS. 7b and 8a the helical fins by reason of their changing pitch engage and accelerate the separator units one at a time into engagement with the surface of an endless belt 162 which then, by means of protruding lugs 163, engages each separator unit to move it in a direction longitudinally of the apparatus substantially ninety degrees from its former motion transversely of the apparatus under action of the bristle-carrying belt members 124. Feed screws 144 are rotated by means of a drive sprocket 148 at the end of each screw, the sprockets 148 being driven by an endless chain engaging all of the sprockets and the chain being driven by a drive sprocket 151 carried by shaft 152 of a gear box 153. The input shaft 154 of gear box 153 is driven by pulley wheel 155 and belt 174 beneath plate member 64.

Endless belt 162 is supported for movement in the direction of the arrows in FIG. 8a by engagement with three pulley wheels 164, 167, and 170 all mounted on parallel shafts which are rotatably supported on plate members 64 and 61 by support elements 166, 169, and 172 respectively. Pulley wheel 164 is rigidly connected to shaft 165 which extends downwardly through plate member 64. On the lower end of shaft 165 is a rigidly connected pulley wheel 173. Pulley wheels 173 and 155 are drivingly connected by endless belt 174 so that the feed screws 144 are rotated in predetermined timed relationship with respect to the movement of belt 162. Shaft 165 and pulley wheel 173 are driven by means of another pulley wheel 175 rigidly connected near the lower end of shaft 165. Pulley wheel 175 is driven by a belt 176 and another pulley wheel 57 rigidly connected to shaft 33 which is driven by transversely extending shaft 58.

Two spaced parallel guide rail elements 159 and 161 are secured in perpendicular relationship with the upper surfaces of plate members 61 and 64 on either side of one portion of belt 162. These rail elements are secured in position by brackets 158 and 160 and extend from the position at which the separator units first engage belt 162 under action of feed screws 144 to a position adjacent the operating parts of the article feed and group forming means 200. The rail elements guide the separator units as the separator units are moved longitudinally of the apparatus by engagement with the lugs 163 of belt 162.

At the right hand extremity of the separator unit feed means 100 as viewed in FIGS. 7a and 8b is a planar member 101 which is a slightly offset extension of plate member 64. Member 101 is provided with a transversely extending slot 109 in which is mounted a reciprocating member 111. Reciprocating member 111 carries a ram member 110 pivotally secured thereto for pushing a horizontally disposed nested series of separator units S into operative engagement with the bristles 125 carried by endless belt members 124. Member 111 is clamped or otherwise suitably secured to an endless cable 115 which extends around two spaced pulley wheels 119 mounted on support element 120 in member 101. Cable 115 is attached to a reciprocable piston 116 in a cylinder 117 of a pneumatically operated motor also mounted on element 120 in member 101. The pneumatically operated motor is selectively actuated by conventional controls not shown to actuate ram member 110 and feed a reserve supply of separator units S positioned on member 101 into engagement with the bristles 125 of belt members 124 for movement toward engagement with the feed screws 144.

The article or can feeding and group forming means 200 is shown in detail in FIGS. 11, 12 and 13 and is located adjacent the separator unit feed means 100 and mounted on a plate member 61 which is supported by brackets 58 and 60. As shown in FIG. 11, two continuous series of articles or cans are supplied to two converging sets of guideways, or tracks mounted on the upper surface of plate member 61, for guiding the supply movement of the articles or cans. Each guideway comprises a first outer straight inlet portion formed by straight guide elements 213 and 213' positioned near the outer edges of plate member 61. These outer straight portions blend with inwardly curving guideways formed by curved guide elements 214 and 214'. The inwardly curving guideways formed by elements 214 and 214' join, or become tangent to each other, at a position adjacent the outlet end of said element 159 which guides separator units from the preceding separator unit feed means into cooperative engagement with groups of articles or cans moving along the guideways at the position of intersection. The guideways are formed as shown in FIG. 13 by lower guide elements such as 214' in engagement with plate member 61 and by upper guide elements such as 214 spaced above the plate member 61 by means of support elements 270 and cooperating bracket elements 215, so that both the upper and lower portions of the cans are positively controlled as to position during movement along the guideways from the outer inlet portions toward the inner or outlet portions on portion 285 of plate member 61. Between the outer inlet portion and inner outlet portions of the guideways, the curved guide elements 214 and 214' form circular paths. Eccentrically mounted on plate member 61 with respect to these circular path portions of the guideways are two fixed shafts 201 substantially perpendicular to the planar surface of the plate member. Fixed shafts 201 are mounted in brackets 58 carried by frame support elements 1. A fixed or stationary cam plate member 211 is rigidly supported on the upper end of each fixed shaft 201 and is provided on its lower or underside with a circular cam groove 210 which is concentrically positioned with respect to the circular portion of the guideways and eccentrically positioned with respect to the axis of shaft 201. A rotatably mounted hollow sleeve member 202 surrounds fixed shaft 201 and extends from the upper end of bracket 58 to the lower side of cam plate member 211. A rotary circular plate member 203 is rigidly attached to the upper end of sleeve member 202 and maintained in close proximity to the underside of cam plate member 211. Rotary plate member 203 is provided at its upper surface with a plurality of grooves or slots extending radially outwardly from shaft 201. In each slot in member 203 is slidably mounted an elongated shaft element 206 provided at its outer end with a can pusher plate 207, and also provided with a cam follower roller 208 mounted thereon which is engaged in cam groove 210 in the cam plate member 211. Sleeve member 202 is rotated by means of gear box 205 driven by transverse shaft 29. Rotation of sleeve members 202 cause rotation of plate members 203 which carries the shaft elements 206 with pusher plates 207 around in operative relationship to the guideways as shown by the arrows in FIG. 11 to move cans from the outer inlet portions of the guideways to the inner outlet portions. Due to the eccentric relationship of the center of rotation of the plate member carrying the shaft elements 206 and the reciprocating action of the shaft elements in plate member 203, the circumferential spacing of can pusher elements 207 along the circular portions of the guideways will increase as the elements 207 traverse this portion of the guideways. This action will accelerate the cans or articles positioned between each can pusher element 207 as they move toward the converging position. This acceleration results in a continuous series of articles received at the each continuous series of cans is divided into spaced groups of articles by the time they reach the outlet portions of the guideways. With respect to handling cans, each continuous series of cans is divided into spaced groups of three in each guideway and groups of three cans from each of the two guideways are brought together and simultaneously brought into engagement with separator units S at the intersecting position of the guideways.

The lugs 163 on belt 162 of the separator unit feed component 100 move the separator units along the guide rail element 159 as shown in FIG. 11 to the point where the separator unit is engaged and moved further by action of the leading cans in each of the two converging groups of three. The group of six cans in engagement with their separator unit S are then moved by can pusher elements 207 toward floor plate 513 of the can or article transfer means 500 as shown in FIG. 11.

The construction of the bottom film edge gripping and feeding component of the bottom film supply and initial package forming means 300 is best shown in FIGS. 14, 15, and 16. Two elongated assemblies each comprising a plurality of cooperating track elements 302 are supported by brackets 301, 65, 66, and 73 on the supporting frame structure. Sprocket wheels 311 and 306 are mounted in operative alignment and association with the track elements 302 at each end of the elongated assemblies. Each assembly is also provided with a third idler sprocket wheel 309 as shown in the drawings. An endless chain assembly is carried in guide grooves 305 in the track elements 302 and is engaged by each sprocket wheel of each assembly to be driven in the direction shown by the arrows in FIG. 15. Each endless chain assembly comprises chain units 365 and a plurality of tenter clip devices 360 as shown in FIGS. 11, 17, and 18. The endless chain assemblies together form a conveyor for engaging the bottom film as it leaves the friction drive roll 31 and conveying it toward engagement with the main conveyor means. The structure and operation of the tenter clip devices will be apparent from FIGS. 17 and 18. The tenter clip devices are secured to the chain units by threaded pins 364, and comprise a guide shoe portion 362 which fits into guide grooves 305 in track elements 302, and a fixed jaw portion 361 which carries a horizontally disposed cylindrical resilient gripping element 366 secured thereto. The tenter device further comprises a pivotably movable jaw portion having a sharp-edged gripping element 367 arranged to cooperate with resilient gripping element 366, said pivotably movable jaw portion also having a cam-engaging lever arm 368 secured thereto. The tenter device is further provided with a spring 370 for urging the gripping elements 366 and 367 into operative engagement. Adjacent the sprocket wheels 306 and 311 at each end of the elongated assemblies are cam elements 312 and 308 which cooperate with the cam engaging lever arms 368 of the tenter clip devices as they pass around the adjacent sprocket wheels to move the gripping elements apart to inoperative position so that adjacent sprocket wheel 311 the edges of bottom film $F_1$ can be moved between the gripping elements for engagement thereby and adjacent sprocket wheel 306 the bottom film edges can be moved out of engagement therewith. From the drawings it will be seen that the edges of the bottom film, BF or $G_1$, will be gripped by the tenter clip devices 360 at the divergent end of the opposed elongated assemblies supporting the endless chains which carry the tenter clip devices and the engaged edges will be carried or conveyed in a longitudinal direction while being moved closer together as the moving tenter clip device chain assemblies converge. Bringing the edges of the bottom film toward each other in this way causes the center portion of the bottom film to sag downwardly and form the trough-like portion of the film envelope which will surround the articles. Formation of the bottom film into the trough-like configuration is assisted by engagement of the center portion of the moving film by the downwardly inclined edge portion of elements 512 of the article transfer means 500. As the outer edges of the bottom film are gradually brought together and the center portion of the film drops down to form the trough-like configurations, the center portion follows a line indicated by $F_B$ in FIG. 5a. The angle made by the plate members 61, 62, and 64 (of the separator unit feed means 100 and the article feed and group forming means 200) with the horizontal corresponds to the angle formed between the line followed by the edges of the film and the line followed by the center portion of the film so that the separator units and articles are properly aligned to be moved smoothly and effectively into the trough-like portion of the bottom film.

The can or article group transfer means 500, which transfers the groups of articles from the article feeding and grouping means 200 into engagement with the bottom film trough-like portion and with the main conveyor means, is best shown in FIGS. 14, 15, and 16 and comprises two elongated inclined interconnected parallel frame plate elements 502 pivotably mounted at one end on transverse shaft 501 which is carried at the upper end of bracket 66. Side plate elements 502 are resiliently supported near their other ends by the engagement of spring urged vertical piston elements 505 carried on brackets 503, secured to the side plate elements, with the upper surfaces of brackets 65. A first sprocket 510 (FIG. 15) is rigidly mounted on shaft 501 at one end between side plate elements 502 and a second sprocket 508 is similarly mounted between the side plate elements 502 at their other ends. An endless chain assembly 509 extends around these two sprockets 508 and 510 and carries a plurality of article or can pusher elements 511. Can pusher elements 511 are provided with lateral arm portions 512 which carry roller elements 513 which ride in and are guided by opposing endless guide grooves 514 formed in the inner opposing surfaces of the side plate elements. Can pusher elements 511 are moved in the direction indicated by the arrows in FIG. 14 under the driving action of drive sprocket 510, shaft 501, and drive sprocket 40 rigidly connected to shaft 501.

Two spaced parallel vertical side plate elements 512 are secured to bracket 65 immediately below side plate elements 502. These side plate elements support a downwardly inclined floor plate 513 which guides groups of articles being moved by can pusher elements 51 downwardly from the portions 285 of plate member 61 of the article feed and group forming means 200 into engagement with the lower center portion the bottom film $F_B$ trough-like configuration where it is supported by the conveyor rack elements 404 of the main conveyor means 400. Interconnected side plate elements 502 are pivotably mounted on shaft 501 at one end of the unit and resiliently supported by spring-urged piston 515 near the other end so that a jam of the mechanism resulting from can pusher elements 511 engaging the top of a can at the inlet end of the unit will cause the inlet or resiliently mounted end of the unit to rise by pivoting around shaft 501. This pivoting motion will actuate a switch 506 carried on bracket 65 (FIG. 14) and having an element thereof in engagement with one of the side plate elements 502, so that an alarm is sounded on the power to the apparatus shut off.

The overall arrangement of the film and article group main conveyor means 400 is shown generally in FIGS. 5a, 5b, 5c, 5d, 5e, 6, and has been covered generally in the preceding discussion. A more detailed showing of this conveyor means appears in FIGS. 46, 47, and 48. The horizontal, longitudinally extending track elements 12 are provide at each side of their upper surface with cut out portions which form longitudinally extending grooves as best seen in FIG. 48. Each track element 12 carries on its upper surface a double chain assembly 401. Upright side plates 402 and 403 are secured to chain assembly 401 at spaced positions by means of transversely extending pins 405 and conventional snap ring elements. Side plates 402 engage the outer grooves in track elements 12 and side plates 403, which have a greater vertical height, engage the inner grooves in track elements 12 to maintain proper lateral alignment of the chain assembly. Each of the inner side plates 403 are provided at the upper edge thereor with cut out portions which receive and engage end portions of the article conveyor rack elements 404 to support the rack elements 404 between the side plates 403. The rack elements 404 are formed of small diameter flexible resilient rod or wire stock formed in the configuration shown in FIGS. 46, 47, and 48 to support and convey the groups of articles on the bottom film along the conveyor means path of movement. The diameter is selected and the rack elements are designed so that adequate support is provided for the articles conveyed and so that adequate air flow is permitted around the articles and rack elements and between them during the heat shrinking operation so that substantially all of the film engaged between the rack elements and the articles is sufficiently heated to give the desired reasonably uniform and adequate shrinkage. The ends of the rack elements 404 are constructed so that they may be elastically deformed and easily snap-fit in the cut out portions in the upper edges of side plates 403, and easily removed therefrom by similar manipulation. Obviously the rack elements 404 may be replaced with different size and shape elements to enable suitable handling of various types of articles. The main conveyor assembly operates at a predetermined speed to continuously convey not only the articles but also the film which surrounds the articles, toward the outlet end of the apparatus where the completed packages are either removed or engaged by another conveyor for further handling. If desired, the main conveyor means 400 could be terminated at a position between the two shrinking units, or at a position between the severing means 900 and the first shrinking unit 1000 and the articles moved beyond this position by an independent continuously running conveyor of a similar type. Such an arrangement would insure that, upon shut-down of the main apparatus and main conveyor due to jam or casualty or other reason, articles already beyond the termination position would be carried automatically safely through the shrinking units by the continuously running independent conveyor without incurring damage due to being stopped in the shrinking units which are preferably are the heat shrinking type.

The top film feeding means 600 is shown in detail in FIGS. 19, 20, and 21 and is mounted on bracket members 67 carried by supporting frame elements 1. A rotary transverse shaft 601 is rotatably and slidably mounted in the upper portions of bracket members 67 and carries a first pair of parallel outer arm elements 602 rotatably attached thereto. Arm elements 602 carry at one end thereof a transversely extending shaft 603 on which is mounted a friction drive roll member 604. Roll member 604 is rigidly secured to shaft 603 which is driven by a chain 42 in engagement with sprocket 605 secured to one end of the shaft. The ends of arm elements 602 which carry shaft 603 are slidably supported on shelf-like support plates 644 carried by transverse beam element 624 which is secured to brackets 67. Shaft 601 also carries a second pair of parallel inner arm elements 607 rigidly secured thereto for pivotal rotation with the shaft. Inner arm elements are each provided at their nonpivoted ends with cradle elements 615 for supporting a rotatable chuck unit 630 carrying an upper roll of film 616. The chuck unit is so positioned by the inner arm elements 607 that a film roll carried by the chuck unit is maintained in frictional driving engagement with drive roll 604. The inner arm elements are provided with latch means comprising the spring-urged plunger elements 618 for maintaining the chuck unit in position on the cradle, and a lug 622 which engages an actuating element on a switch device carried on one of the outer arms 602 to signal depletion of the film roll on chuck unit 630.

One end of shaft 601 is provided with a bore 632 which has a threaded portion 623 in which is threadably received a screw element 634. Screw element 634 is fixed against axial motion and is mounted for rotation by electric motor 637 through gear box 636 both of which are mounted on bracket 67a. It is believed to be clear that rotation of screw element 634 will cause transverse movement of shaft 601 and the entire assembly connected to it and comprising the inner and outer arms, the drive roll and the chuck unit. Motor 637 is reversible and is driven in response to signals generated in a photocell unit 638 mounted on rod 643. Unit 638 senses the lateral position of one edge of the top film from roll 616 and should the edge deviate from the desired position, the electrical arrangement cooperating with the unit 638 and motor 637 and shown in FIGS. 49, 50, and 51 will cause the motor 637 to rotate screw element 634 and move shaft 601 to return the film edge to the desired position. A laterally extending element 639 secured to one of the outer arm elements 602 carries two abutments 640 which engage a roller on an actuating arm of a limit stop switch unit 642. Unit 642 sounds an alarm and/or deenergizes motor 637 when the position of shaft 601 exceeds certain predetermined limits. The upper film $F_2$ from the chuck unit 630 passes over the drive roll 604 and downwardly around idler roller 626 which positions the film for movement to the seam sealing means 700. At this point the relationship of the cans and the upper and lower films is generally as shown in FIG. 3.

The seam sealing means 700 is shown in detail in FIGS. 22, 23, 24, and 25 and is mounted on the supporting frame structure by bracket members 67 and 68. A transversely extending beam element 701 is mounted on inwardly projecting lugs 67b carried by bracket member 67. Two pairs of opposed longitudinally extending beam elements 735 and 736 are connected between beam element 701 and bracket members 68. Beam element 701 carries a horizontal transversely extending shaft 703 rotatably mounted in projecting portions 702. Shaft 703 carries two pulley wheels 704 rigidly attached thereto. Bracket 68 is provided with two gear boxes 726 secured near the upper portions thereof, one of which gear boxes drives a transverse horizontal shaft 724 which carries two pulley wheels 723 and 725 rigidly attached thereto. Endless helical wire spring conveyor elements 705 connect these two sets of pulley wheels as shown in FIGS. 22, 23, and 24. Helical wire conveyor element structure is shown in detail in FIG. 54, and it possesses a smooth cylindrical exterior surface formed by grinding or otherwise smoothing the exterior surface of a conventional endless helical wire conveyor element. Beam element 701 also carries two parallel vertical shafts 708 rotatably mounted in projecting portions 709 each of these shafts 708 carries a pulley wheel 707.

Bracket member 68 also carries two parallel vertical shafts 727 and 728 each carrying pulley wheel 730 and 729 respectively. Endless helical wire conveyor elements 706 connect these two sets of pulley wheels as shown in FIGS. 22, 23 and 24. Shaft 728 and its pulley wheel are driven by the left hand gear box 726 as viewed in FIG. 24, the input shaft of which is shaft 724. The other gear box 726 is driven by vertical shaft 727 which is connected to output shaft 732 of gear box 733 which is driven by an input shaft carrying sprocket 734 which is in turn driven by a chain 45 engaged with a sprocket 44 on shaft 15. The sprockets carrying the helical wire spring conveyor elements rotate as indicated by the arrows in FIGS. 5b, 22, 23, and 24. For a considerable distance of longitudinal travel the opposed portions of the helical wire spring conveyor elements 705 and 706 move in the same direction and are positioned in aligned side by side lateral contact with each other to engage, grip, and convey the overlapping edges of the upper and lower films as indicated in FIG. 26 so that the overlapped edges protruding outwardly between each pair of spring conveyor elements may be sealed to form fused seams joining the two films to form the tubular envelope surrounding the moving articles. Each pair of the endless spring conveyor elements 705 and 706 are backed up and resiliently urged into contact with each other between the pulley wheels by means of a fixed water-cooled shoe member 721 and a diametrically opposed slidably mounted shoe member 715 as shown in FIGS. 23, 25, and 26. Shoe members 721 are secured to longitudinally extending beam elements 735 and are provided with interior passageways 742 to permit flow of a cooling fluid therethrough. Movable shoe members 715 are slidably mounted in U-shaped brackets 714 and are rigidly connected to rod elements 716 extending through shelf elements 712 mounted on longitudinally extending beam elements 736 as shown in FIGS. 23 and 25. Rod elements 716 are provided with enlarged portions 717 at their lower ends which cooperate with helical compression springs 718 and adjustable fixed abutment elements 719 mounted on shelf elements 713 to urge the movable shoe members 715 upwardly toward engagement with the fixed shoe members 721 to clamp the moving helical spring conveyor elements together. A series of fixed position rotatable upper clamping wheels 737 are mounted on beam elements 735 adjacent the fixxed shoe members 721 as shown in FIGS. 24 and 25 and an opposed corresponding series of movably mounted rotatable lower clamping wheels 739 are mounted on beam elements 736 as shown in FIGS. 24 and 25. The lower clamping wheels 739 are mounted on slidably mounted blocks carried on pin elements 739 and resiliently urged upwardly by helical compression springs 740 toward engagement with the opposing wheels to engage and clamp the moving helical spring conveyor elements 705 and 706 together between the opposed wheels in each series.

Gas burner assemblies 770 are carried by brackets secured to beam elements 735 in a position located between the upper pulley wheels and laterally outside and parallel to the lines of contact of the two pairs of engaged spring conveyor elements 705 and 706. The burner assemblies are shown in FIGS. 23, 26, 27, and 28. Each burner assembly comprises an elongated hollow casing formed by two end plates 772, a curved side wall element 771, and a face plate 776 provided with concave cylindrical outer surface through which are formed a plurality of rows of convergent orifices 777 for gas jets. The burner assembly further comprises an inlet element 774 and an electrical ignition device 773. As seen in FIG. 26, the elongated face plate 776 is aligned to be parallel with the line of contact of spring conveyor elements 705 and 706 and spaced a distance therefrom so that gas jets issuing from the convergent orifices 777 intersect along a position of the overlapping edges of the moving films which are engaged by and protrude outwardly between the spring conveyor elements 705 and 706 to continuously fuse and seal the moving edges together and form a good longitudinal seam. The film configuration as it is received by the spring conveyor elements is best illustrated in FIG. 3. The concave face plate, when hot, is believed also to focus radiant heat on the overlapping film edges to assist in quickly forming the sealed seam. The spring conveyor elements 705 and 706 in cooperation with shoe members 721 and 715 and wheels 737 and 739 hold the overlapping film edges firmly and uniformly in position to insure uniform sealing action during and after treatment of the film edges by the gas burner flame. In addition, this arrangement shields the articles in the surrounding film envelope from the sealing heat created by the burner. The smooth outer surfaces of the spring conveyor elements cooperate to insure even line contact between the elements and with the engaged film for good seam formation. This is considered to be a highly preferred construction.

From the seam sealing means 700 the articles surrounded by the tubular sleeve assembly move to the seam cooling means 800 where the still hot seam is subjected to further clamping pressure to hold the fused edges together while being cooled and solidified in a controlled manner to complete the formation of the desired sealed seam.

Seam cooling means 800 is shown in detail in FIGS. 29, 30, 31, and 32 and is mounted on the supporting frame structure by means of bracket elements 69. Two parallel vertical side plates 801 are secured to bracket element 69 and extend in a generally horizontal longitudinal direction. Two vertically aligned wheel elements 806 and 807 are rigidly mounted on shafts 808 and 809 rotatably received in each of the bracket elements 69. Wheel elements 806 and 807 are driven through a series of engaged gears 815, 816, and 817 which are operatively connected to sprocket wheels 820, which are engaged with, and driven by, the main conveyor chain assembly 401. Two longitudinally extending horizontal parallel guide shoe elements 803 and 804 are mounted as shown in the FIGS. 29 and 32 on the vertical side plates 801 and are provided with fittings and internal passageways 805 for the circulation therethrough of cooling fluid. At the forward extremities of vertical side plates 801 are mounted two guide wheels 810 and 811 as shown in FIGS. 29 and 31, and two additional guide wheels 814 and 815 are also mounted on the side plates 801 intermediate the wheels 810, 811 and wheels 806, 807 as shown. These wheel elements engage and support two opposed endless tape members 812 and 813 which are moved in the direction indicated by the arrows in FIG. 29. The tape members are preferably formed of a heat resistant, non-sticking, low coefficient of friction material such as polytetrafluoroethylene and, as seen in FIG. 30, are positioned and aligned to receive between them the fused overlapping edges of the film envelope as they move away from the seam sealing unit 700, and convey the edges for a given longitudinal distance under pressure while at the same time cooling the fused edges to complete formation of a strong seam.

The articles surrounded by the unitary tubular film assembly are continuously moved by the main conveyor means from the seam sealing unit 800 to the tubular film assembly severing means 900.

This severing means 900 is shown in detail in FIGS. 33, 34, 35, 36, 37, 38, and 39 and comprises three parts mounted on brackets 70, 71, and 72. Mounted on brackets 70 are two opposed cutter units 905 rotatably mounted in brackets 904 for rotation about horizontal axes to make horizontal transverse cuts in the top and bottom walls of the moving unitary tubular film assembly. These cutter units, best shown in FIG. 36, are mounted on shafts 918 and driven in timed relationship to movement of the unitary tubular film assembly by means of drive shafts 907, 909, 910, gear boxes 908, sprocket wheel 913, chain 47, and sprocket wheel 46 carried by rotary main drive shaft 15. Mounted on brackets 71 are two other opposed cutter units 905 rotatably mounted in brackets 904 for rotation about vertical axes to make vertical transverse cuts in the side walls of the moving unitary tubular film assembly and complete the operations of severing the tubular film assembly between the articles or cans to form individual tubular sleeve members each surrounding a group of the articles. The cutter units 905 on brackets 71 are mounted on shafts 918 and driven in timed relationship with movement of the tubular film assembly by means of drive shafts 919, 920, 922, and gear boxes 921 and 923 which are driven by sprockets 925 and 48 which are connected by chain 49. Brackets 71 are connected at their upper extremities by transverse element 916. Element 916 carries two downwardly extending spaced parallel bracket elements 929 which carry shaft 930. Rigidly carried by shaft 930 are a pair of rotatable snubber assemblies which resiliently engage the tops of the cans C just prior to cutting engagement of the top and bottom walls of the tubular film assembly by the cutter units carried by brackets 70. This engagement secures the film assembly and cans against movement relative to each other and other structures during the cutting action to insure a clean complete cut. These snubber assemblies are driven in timed relation with the horizontal axis cutter units by means of sprockets on shafts 930 and 907 (of the cutter units mounted on brackets 70) interconnected by chain 929 (FIG. 33). These snubber assemblies carried on shaft 930 comprise an elongated bar element 931 in each end of which are secured rods carrying resilient cushion elements 933 which engage and hold the film and cans against movement during the cutting action. A similar additional pair of rotatable snubber assemblies for resiliently engaging the sides of the cans just prior to cutting engagement of the side walls of the tubular film assembly by the cutter units carried by brackets 71, are mounted on transverse element 72 on vertical rotatable shafts 935 which are driven by gear boxes 939, drive shafts 940, gear box 941, sprocket 943 and chain 51. The construction and function of these snubber assemblies is similar to that of the first mentioned snubber assemblies except that the sides of the cans are engaged prior to the engagement of the cutter units mounted on brackets 71 to insure proper cutting of the side walls of the tubular film assembly. A detailed showing of the cutter construction appears in FIGS. 37, 38, and 39.

A rotating base plate 945 is rigidly secured to one end of shaft 918 (FIG. 37). Base plate 945 is provided with two cutaway portions 947 which form portions 948 of reduced thickness, and an opening 970 through the central portion of the plate. Adjacent and along the upper edges of base plate 945 elongated serrated cutter blade element 952 is swingably mounted in cutaway portion 947. Cutter blade element 952 is pivotally connected to one end of an arm 950 of a bell crank lever which is pivotally mounted on shaft 956 rigidly secured to the base plate, another arm 949 of the bell crank lever is provided with a rotatable cam follower roller 951 which engages a stationary cam element 914 fixedly secured in position around shaft 918. The bell crank lever is also provided with another arm 957 having a tip portion 962. Cutter blade element 952 is also pivotally connected to one end of a flexible resilient element 958, preferably a helical compression spring element, which is secured at its other end in a U-shaped guide bracket 959 which is rigidly connected to base plate 945. Spring element 958 urges cutter blade element 952 to swing outwardly from the upper edge of the base plate element for its cutting stroke as shown by the arrow $A_2$ in FIG. 37. A latch element 960 is pivotably mounted on pin 961 adjacent the opening 970 in the base plate element and is provided with one end carrying a notch for engaging the tip 962 of arm 957 of the bell crank lever, and another end 964 positioned adjacent the opening 970 for engagement with contact element 965 mounted on one end of latch actuating lever 966 which is pivotably mounted on base plate element 945 by pin 967. Latch element 960 is urged toward engagement with tip 962 of arm 957 by spring element 963. Latch actuating lever is provided at its other end with two cam follower rollers 968 which engage a stationary crown cam element 969 carried on cam element 914.

Cam element 914 is so contoured on its periphery that as the base plate element 945 and its associated parts are rotated by shaft 918 out of the operative cutting position in engagement with the film, the cam 914 engages cam follower roller 951 to move its arm 949 and the bell crank lever in a clockwise direction as viewed in FIG. 37 which moves the swingable cutter blade element 952 to the position shown at the upper edge of the cutter unit in this figure in which the spring element is under compression, and the latch element 960 engages tip 962 of the bell crank lever to latch the upper cutter blade element and its associated parts in cocked position against the action of spring element 958. Then as the cutter unit and its base plate element 945 are rotated into engagement with the film to be cut, the cam periphery first moves clear of the roller 951 and next crown cam 969 engages roller 968 and pivots latch actuating lever in a clockwise direction as seen in FIG. 37 to cause its contact element 965 to engage end 964 of the latch element 960 and move it in a counterclockwise direction to release tip 962 of the bell crank lever and permit spring element 958 to suddenly move the cutter blade element 952 through its cutting stroke. This same action occurs in similar mechanisms on the other side of the upper edge of base element 945 to cause cutter blade element 954 which cooperates with blade element 952 to be moved simultaneously through its cutting stroke so that the corresponding serrations on each cooperating blade element both pierce and shear the film for a rapid clean cut. The cooperating cutter blade elements of similar mechanisms on either side of the bottom edge of base plate 945 operate in the same manner, as will be clear from the drawings, so that as each edge of the base plate element 945 and the cutter unit is rotated into engagement with the film to be cut the cutter blade elements there are actuated through their cutting strokes, and as this edge is rotated through its path the cutter blade elements and their parts are automatically returned to their cocked positions so that the cycle may be repeated continuously. As seen in FIG. 37, there are two sets of cutter blade elements and operating mechanisms on each side of base plates 945. All of the cutter units are of the same construction. The cutter unit mechanisms are protected and shielded by planar cover sheets 906 secured by screws to projections on the cutter unit base plate elements.

The tubular sleeve members and enclosed articles are moved continuously from the severing means 900 to the package end shrink means 1000 which is shown in detail in FIGS. 40 and 41. Package end shrink means 1000 comprises an air heating and circulating system with flow generally indicated by the arrows in FIGS. 40 and 41, mounted on transverse support brackets 6 and lower support members 7 and 7a carried by the main supporting frame structure. This system comprises a casing structure with side elements 1001 and end elements 1002 having openings therein for passage of the packages on the main conveyor means. The casing structure forms an elongated chamber 1070 extending above the line of movement of packages through the end shrink means. The bottom of chamber 1070 is formed by a moving endless belt 1050 which is shown in detail in FIGS. 42 and 43 and which is provided with spaced patterns of holes 1051 therethrough as shown. The spacing between the patterns of holes in the belt 1050 are such that the patterns of holes are aligned only with the spaces between the packages of articles on the main conveyor as they pass beneath chamber 1070. Endless belt is carried by idler rollers 1021 and 1020, and a drive roller 1009 mounted on the casing structure. Roller 1009 is driven by means of sprocket wheel 1008, drive chain 1007, and a sprocket wheel 1005 which engages and is driven by the main conveyor chain assembly 401. Hot air is supplied to chamber 1070 through conduit 1071 from a blower 1015. The hot air supplied to chamber 1070 is directed downwardly through the holes 1051 in the endless belt 1050 to pass between the groups of articles surrounded by the tubular sleeve of film. Since the remainder of the package comprising the film sleeve and contained articles is shielded from the hot air by the unperforated portions of belt 1050, only the open end portions of the film sleeve are subjected to the hot air. This causes the open ends of the film sleeve to shrink sufficiently into engagement with the articles at the ends of the package to insure proper retention of the contained articles in the package. The hot air passing downwardly between the package and through the main conveyor assembly is collected in a chamber 1072 and conducted by passageway 1073 to the inlet of blower 1015 driven by motor 1017 as shown. A suitable gas burner assembly 1018 of conventional design is provided in passageway 1073 to heat the air to the required temperature to accomplish the desired shrinking of the open end portions of each film sleeve. A vertical stack 1013 is connected to conduit 1071. A pivoted door or damper 1014 is provided to normally close off stack 1013 but actuates upon stoppage of the conveyor to vent the hot air outside the casing structure to prevent excessive heating of packages within the casing structure. The main conveyor means continuously moves the packages from the package end shrink means 1000 to the total package shrink means 1100 which is shown in detail in FIGS. 44 and 45. The total package shrink means 1100 comprises an air heating and circulating system with flow generally indicated by the arrows in FIGS. 44 and 45 and is mounted on transverse support bracket 6 and lower support members 7 and 7e carried by the main supporting frame structure. This system comprises a casing structure with side elements 1101 and end elements 1102 having openings therein for passage of the packages on the moving conveyor means. The casing structure forms an elongated chamber 1178 extending below the line of movement of the packages through the total shrink means. Hot air is supplied to chamber 1178 through conduit 1172 from a blower 1115 driven by motor 1117 as shown. The hot air supplied to chamber 1178 passes upwardly through the main conveyor assembly and around the packages on the conveyor assembly where it is collected in a chamber 1170 above the packages and returned through passageways 1171 and 1173 to the blower 1115. A suitable burner assembly 1118 of suitable design is provided in passageway 1173 to heat the air to the required temperature to accomplish the desired shrinking of each of the entire film sleeves into engagement with all of the articles carried therein to complete package formations. From the total package shrink means the completed packages are continuously moved to the end thereof for unloading or engagement by another conveyor for movement to further desired handling or treatment.

FIGS. 49, 50, 51, and 52 show the circuit arrangement used for either or both of the film supply units, and has been described generally in connection with top film supply unit 600. As shown in FIG. 49, 110 volt 60 cycle A.C. power is supplied across the terminals E5 and E6 of the primary winding of transformer $T_1$. Across the secondary winding of transformer $T_1$ is connected a photolight PL which is mounted on element 638 of unit 600. Photolight PL is mounted on element 638 so that it directs a beam of light on the edge of the film passing over the friction drive roller 604 when the film is in the proper lateral position. This beam is reflected back upon photoconductor unit PC which is also mounted on element 638. Photoconductor unit PC is a conventional photoelectric device which varies its resistance or conductivity in accordance with the intensity or amount of light falling upon it. Photoconductor unit PC is connected in series with resistance IR across the secondary winding of transformer $T_1$. Connected in series across terminals E11 and E9 and across the secondary winding of transformer $T_1$ are two rheostats RH1 and RH2 and a fixed resistance R2. A coil C1 is connected across terminal E10 between the photoconductor unit PC and fixed resistance R2 and terminal E16 which is connected to the adjustable arm of rheostat RH2. This bridge arrangement is balanced by adjusting RH1 and RH2 with the system energized and the film edge in the desired position with respect to the photoconductor element PC so that there is no voltage across terminals E10 and E16. When the film edge varies from the desired position the amount of light reflected therefrom and striking the photoconductor device varies which in turn varies the resistance or conductivity of the photoconductor device. This variation in resistance of device PC will cause a voltage signal to appear across terminals E10 and E16, and across the coil C1 connected across E12 and E13. This signal will have characteristics related to the direction of the variation of the film edge from the desired position and is amplified to actuate relays LCR and RCR which are operative to control switches for driving the motor 637 which moves the shaft 601 to carry the film edge back to the desired position at which time the voltage signal across E10 and E16 returns to zero and the motor action ceases. One arrangement for actuating relays LCR and RCR involves connecting terminal E24 of the FIG. 51 circuit to E12 of FIG. 49, terminal E25 to terminal E13, and terminal E26 to E18 or ground, where relays LCR and RCR control switches S1 and S2 which in turn control application of power to two composite, opposed differential windings which control rotaion of the armature of motor 637. FIG. 50 shows the tuning arrangement for adjusting the sensitivity with which the error signal is created or detected across coil R1.

It is believed that the construction and operation of the various component means of the apparatus, as well as the constructions and operations of the overall apparatus combination are clear from the foregoing description.

It is believed further, that it is apparent from this description and accompanying discussions that applicants have provided a new and improved apparatus and method for the high speed efficient forming of packages in accordance with the objects of the invention.

Although preferred embodiment have been described in detail in accordance with the patent statutes many variations and modifications within the spirit of the inventon will occur to those skilled in the art, and all such are considered to fall within the scope of the following claims.

What is claimed is:

1. An improved high speed apparatus for continuously and automatically packaging groups of articles in a tubular sleeve member, said apparatus comprising in combination; a supporting frame structure, conveyor means cooperating with said structure for moving a plurality of articles continuously from a first position to a second position along a given path of movement, film supply means mounted on said structure for supplying shrinkable film continuously into operative association with said conveyor means at said first position, an article transfer means mounted on said structure for receiving a plurality of articles and continuously transferring said plurality of articles into operative association with said conveyor means and with film engaged by said conveyor means, said article transfer means comprising an article grouping means mounted on said structure for receiving a continuous supply of articles and forming the articles into spaced groups, said film supply means and articles carried by said conveyor means cooperating to form said continuously supplied film into an elongated surrounding envelope around said articles as said articles move from said first position toward said second position, a sealing means mounted on said structure adjacent said path of movement and between said first and said second positions and positioned and arranged to engage said surrounding envelope and seal cooperating portions thereof to form a unitary sleeve assembly surrounding said articles as they move toward said second position, a sleeve assembly severing means mounted on said structure adjacent said path of movement between said first and said second positions and positioned and arranged to sever said sleeve assembly between said groups as they move toward said second position to provide individual groups of articles each enclosed by a tubular sleeve member having open end portions, and a sleeve member shrinking means cooperating with said structure and positioned and arranged adjacent said path of movement between said first and second positions to first shrink the end portions of said sleeve member and then the entire sleeve member into secure engagement with said articles contained in said sleeve member, said groups formed with a spacing sufficient to permit operation of said severing means and sufficient to provide at least partial end closure of said sleeve member when treated by said shrinking means, said article grouping means also continuously moving said groups into operative association with said conveyor means and said film, and said sleeve member shrinking means comprising a first shrinking unit for initially shrinking the open end portions of each sleeve member into engagement with the articles at the ends of the contained group of articles to retain said article in said sleeve member and a second shrinking unit for finally shrinking each entire sleeve member into engagement with all of the articles in its contained group.

2. The improved apparatus of claim 1 which further comprises a power drive means cooperating with said structure, and a transmisison means cooperating with said power drive means, said conveyor means, said film supply means, said article transfer means, said sealing means, and said shrinking means for actuating and operating the same in predetermined synchronized relationship with each other and said power drive means.

3. The improved apparatus of claim 1 which further comprises a means mounted on said structure in cooperation with said article transfer means for feeding and transferring a plurality of article spacer units continuously into operative association with said articles and film at said first position.

4. The improved apparatus of claim 1 in which said sealing means comprises a seam heat sealing unit, and a seam cooling and clamping unit.

5. The improved apparatus of claim 4 in which said film supply means comprises a first film feed and manipulating unit for forming, adjacent said first position, a first portion of the envelope surrounding said articles, and a second film feed unit for forming the remaining portion of said envelope between said first and second positions after said articles have been transferred into cooperative association with the first film and said conveyor means at said first position.

6. The improved apparatus of claim 1 in which said film supply means comprises a film feeding and manipulating mechanism for forming at least a portion of the envelope surrounding said articles, said mechanism comprising two elongated feed assemblies each comprising a driven movable endless member mounted on said structure in opposing converging relationship such that said assemblies cooperate with said article transfer means and converge at a point adjacent said first position, each endless member provided with a spaced plurality of film clamping devices constructed and arranged, in cooperation with said article transfer means, to engage and grip the edges of a film supplied between said feed assemblies, and positively convey such a film toward said first positions while moving the film edges toward each other to commence formation of said tubular envelope concurrently with movement of the articles into engagement with said film by said article transfer means, each feed assembly further comprising control means to actuate said clamping devices to engage and grip the film edges during movement toward said first position and release the film edges as the edges reach the extremities of the endless members.

7. The improved apparatus of claim 1 in which said film supply means comprises a movable bracket member mounted on said frame structure, a rotatable element carried by said bracket member for supporting a roll of film to be supplied through said first position to said second position, said film supply means further comprising a positioning means cooperating with said bracket for moving said bracket to control the lateral position of said film and maintain said film in predetermined lateral alignment with respect to said conveyor means, and an actuating means operatively connected with said positioning means, said actuating means comprising a film edge sensing device cooperating with film carried by said rotatable element.

8. The improved apparatus of claim 3 in which said means for feeding and transferring said article spacer units comprises two parallel spaced feed assemblies each mounted on said structure and each comprising a movable endless belt member having a portion thereof opposed to a portion of the endless belt member of the other, the belt member provided with flexible resilient bristles constructed and arranged to receive and yieldably engage a series of article spacer units between the opposed portions of the belt members and move said spacer units toward engagement with said articles positioned on said article transfer means.

9. The improved apparatus of claim 1 in which said first shrinking unit comprises structure defining a heat shrinking zone, a means for producing a moving stream of heated gas and conducting said stream into said zone, and a heat shielding means movable in timed relationship with said articles and said conveyor means in said zone and constructed and arranged to direct said stream of heated gas in said zone upon the open end portions of the tubular sleeve assemblies surrounding and containing said articles.

10. The improved apparatus of claim 4 in which said seam heat sealing unit comprises a gas burner assembly, said assembly comprising an elongated casing structure extending along said path of movement between said first and second positions and constructed and arranged to heat film edges of the surrounding envelope and seal them together to form the unitary sleeve assembly, said elongated casing structure provided with a gas inlet, an ignition device, and an elongated side wall structure having a plurality of gas jet orifices extending therethrough in an elongated pattern extending along said path of movement, said elongated side wall structure provided with a concave cylindrical exterior surface portion, and said orifices positioned and arranged along said surface portion so that a plurality of gas jets at each of a series of positions along said wall structure, projecting from said orifices, intersect at a position where the film edges form the seam, said concave surface portion further constructed and arranged to cooperate with the film edges and the gas jets to focus radiant heat from the surface, when heated, on the film edges to aid in forming the sealed seam.

11. An improved high speed apparatus for continuously and automatically packaging groups of articles in a tubular sleeve member, said apparatus comprising in combination; a supporting frame structure, conveyor means cooperating with said structure for moving a plurality of articles continuously from a first position to a second position along a given path of movement, film supply means mounted on said structure for supplying shrinkable film continuously into operative association with said conveyor means at said first position, an article transfer means mounted on said structure for receiving a plurality of articles and continuously transferring said plurality of articles into operative association with said conveyor means and with film engaged by said conveyor means, said film supply means and articles carried by said conveyor means cooperating to form said continuously supplied film into an elongated surrounding envelope around said articles as said articles move from said first position toward said second position, a sealing means mounted on said structure adjacent said path of movement and between said first and said second positions and positioned and arranged to engage said surrounding envelope and seal cooperating portions thereof to form a unitary sleeve assembly surrounding said articles as they move toward said second position, a sleeve assembly severing means mounted on said structure adjacent said path of movement between said first and said second positions and positioned and arranged to sever said sleeve assembly between said articles as they move toward said second position to form individual groups of articles each enclosed by a tubular sleeve member having open end portions, and a sleeve member shrinking means cooperating with said structure and positioned and arranged adjacent said path of movement between said first and second positions to first shrink the end portions of said sleeve member and then the entire sleeve member into secure engagement with said articles contained in said sleeve member, said sleeve member shrinking means comprising a first shrinking unit for initially shrinking the open end portions of each sleeve member into engagement with the articles at the ends of the contained group of articles to retain said article in said sleeve member, and a second shrinking unit for finally shrinking each entire sleeve member into engagement with all of the articles in its contained group, said sleeve severing means comprising a sleeve cutter mechanism, said apparatus further comprising clamping means for securing said sleeve and contained articles against movement relative to each other during the operation of the cutter mechanism.

12. The improved apparatus of claim 11 in which said cutter mechanism comprises a movable cutter assembly mounted on said frame structure and movable between a first cutter assembly position in operative cutting engagement with said sleeve assembly moving along said path, and a second cutter assembly position spaced from said first cutter assembly position, said cutter assembly comprising a pair of serrated cooperating cutter elements movable relative to each other and relative to said cutter assembly to perform a cutting action, said cutter assembly further comprising a resilient means mounted thereon in engagement with said cutter elements for driving said cutter elements to perform their cutting action when said cutter assembly is in said first position, and said cutter assembly further comprising a cam means cooperating with said assemblies and said cutter elements for moving the cutter elements against the action of said resilient means during movement of said cutter assembly between its said second and first positions, and for releasing said cutter elements for movement thereof by said resilient means when said cutter assembly reaches its said first position.

13. An improved high speed process for continuously automatically packaging groups of articles in a tubular sleeve member, said process comprising the following steps in combination; continuously conveying a plurality of articles from a first position along a given path of movement to a second position, supplying shrinkable film continuously into operative association with said articles at said first position, said articles being formed into spaced groups before they reach said first position, forming said film into an elongated surrounding envelope around said articles as said articles move from said first position toward said second position, sealing said film to form a unitary sleeve assembly surrounding said articles as they move toward said second position, severing said sleeve assembly between said groups of articles as they move toward said second position to form individual groups of articles each enclosed by a tubular sleeve member having open end portions, and first shrinking the end portions of said sleeve members and then the entire sleeve member into secure engagement with said articles contained in each sleeve member, the spacing between said groups being sufficient to permit operation of said severing means and sufficient to provide at leat partial end closure of said sleeve members when treated by said first shrinking step, said shrinking steps being accomplished in a first stage wherein said open end portions of each sleeve member are shrunk into engagement with the articles at the ends of the contained groups, and in a final stage in which each entire sleeve member is shrunk into engagement with all of the articles in its contained group.

14. The improved process of claim 13 which further comprises continuously transferring a plurality of article spacer units into operative association with said articles and said film at said first position.

15. The improved process of claim 13 in which formation of said elongated surounding envelope is accomplished by engaging and gripping edges of supplied film to positively convey such film toward said first position while simultaneously moving the film edges toward each other to commence formation of the envelope during movement of said articles into engagement and operative association with said film.

16. The improved process of claim 13 in which said sleeve assembly and contained articles are secured against relative movement during said severing step.

17. An improved high speed apparatus for continuously and automatically packaging groups of articles in a tubular sleeve member, said apparatus comprising in combination; a supporting frame structure, conveyor means cooperating with said structure for moving a plurality of articles continuously from a first position to a second position along a given path of movement, film supply means mounted on said structure for supplying shrinkable film continuously into operative association with said conveyor means at said first position, an article transfer means mounted on said structure for receiving a plurality of articles and continuously transferring said plurality of articles into operative association with said conveyor means and with film engaged by said conveyor means, said article transfer means comprising an article grouping means mounted on said structure for receiving a continuous supply of articles and forming the articles into spaced groups, said film supply means and articles carried by said conveyor means cooperating to form said continuously supplied film into an elongated surrounding envelope around said articles as said articles move from said first position toward said second position, a sealing means mounted on said structure adjacent said path of movement and between said first and said second positions and positioned and arranged to engage said surrounding envelope and seal cooperating portions thereof to form a unitary sleeve assembly surrounding said articles as they move toward said second position, a sleeve assembly separating means mounted on said structure adjacent said path of movement between said first and said second positions and positioned and arranged to separate said sleeve assembly between said groups as they move toward said second position to provide individual groups of articles each enclosed by a tubular sleeve member having open end portions, and a sleeve member shrinking means cooperating with said structure and positioned and arranged adjacent said path of movement between said first and second positions to first shrink the end portions of said sleeve member and then the entire sleeve member into secure engagement with said articles contained in said sleeve member, said groups formed with a spacing sufficient to permit operation of said separating means and sufficient to provide at least partial end closure of said sleeve member when treated by said shrinking means, said article grouping means also continuously moving said groups into operative association with said conveyor means and said film, and said sleeve member shrinking means comprising a first shrinking unit for initially shrinking the open end portions of each sleeve member into engagement with the articles at the ends of the contained group of articles to retain said article in said sleeve member and a second shrinking unit for finally shrinking each entire sleeve member into engagement with all of the articles in its contained group.

18. An improved high speed process for continuously automatically packaging groups of articles in a tubular sleeve member, said process comprising the following steps in combination; continuously conveying a plurality of articles from a first position along a given path of movement to a second position, supplying shrinkable film continuously into operative association with said articles at said first position, said articles being formed into spaced groups before they reach said first position, forming said film into an elongated surrounding envelope around said articles as said articles move from said first position toward said second position, sealing said film to form a unitary sleeve assembly surrounding said articles as they move toward said second position, separating said sleeve assembly between said groups of articles as they move toward said second position to form individual groups of articles each enclosed by a tubular sleeve member having open end portions, and first shrinking the end portions of said sleeve members and then the entire sleeve member into secure engagement with said articles contained in each sleeve member, the spacing between said groups being sufficient to permit operation of said separating means and sufficient to provide at least partial end closure of said sleeve members when treated by said first shrinking step, said shrinking steps being accomplished in a first stage wherein said open end portions of each sleeve member are shrunk into engagement with the articles at the ends of the contained groups, and in a final stage in which each entire sleeve member is shrunk into engagement with all of the articles in its contained group.

References Cited

UNITED STATES PATENTS

| 2,007,981 | 7/1935 | Nordquist | 198—34 X |
| 2,864,212 | 12/1958 | Bruce | 53—48 X |
| 3,154,418 | 10/1964 | Lovell et al. | 53—184 X |
| 3,215,266 | 11/1965 | Dreyfus | 206—65 |
| 3,239,991 | 3/1966 | Copping | 53—48 X |

THERON E. CONDON, Primary Examiner

R. L. SPRUILL, Assistant Examiner

U.S. Cl. X.R.

53—30, 48, 159, 184